(12) United States Patent
Kerker et al.

(10) Patent No.: US 7,953,645 B2
(45) Date of Patent: May 31, 2011

(54) SYSTEM AND METHOD FOR MANAGING RECURRING ORDERS IN A COMPUTER NETWORK

(75) Inventors: William S. Kerker, Jenison, MI (US); Thomas D. Paasche, Grand Rapids, MI (US); Dave Bamborough, Kentwood, MI (US); Randy S. Bancino, Rockford, MI (US); Robin Horder-Koop, Ada, MI (US); Kenneth J. McDonald, Ada, MI (US); John P. Parker, Ada, MI (US); Claire E. Zevalkink, Grand Rapids, MI (US)

(73) Assignee: Amway Corp., Ada, MI (US)

( * ) Notice: Subject to any disclaimer, the term of this patent is extended or adjusted under 35 U.S.C. 154(b) by 1005 days.

(21) Appl. No.: 11/824,039

(22) Filed: Jun. 29, 2007

(65) Prior Publication Data

US 2008/0015951 A1 Jan. 17, 2008

Related U.S. Application Data

(63) Continuation of application No. 09/714,774, filed on Nov. 16, 2000, now Pat. No. 7,353,194, which is a continuation-in-part of application No. 09/515,860, filed on Feb. 29, 2000, now Pat. No. 6,980,962.

(60) Provisional application No. 60/122,385, filed on Mar. 2, 1999, provisional application No. 60/126,493, filed on Mar. 25, 1999.

(51) Int. Cl.
*G06Q 30/00* (2006.01)

(52) U.S. Cl. .................... 705/26.1; 705/27.1

(58) Field of Classification Search ......... 705/26.1–27.2
See application file for complete search history.

(56) References Cited

U.S. PATENT DOCUMENTS

| | | | |
|---|---|---|---|
| 4,799,156 A | 1/1989 | Shavit et al. |
| 4,941,090 A | 7/1990 | McCarthy |
| 4,958,280 A | 9/1990 | Pauly et al. |
| 4,972,318 A | 11/1990 | Brown et al. |
| 4,984,155 A | 1/1991 | Geier et al. |
| 4,992,940 A | 2/1991 | Dworkin |
| 5,025,372 A | 6/1991 | Burton et al. |
| 5,053,957 A | 10/1991 | Suzuki |
| 5,056,019 A | 10/1991 | Schultz et al. |
| 5,063,507 A | 11/1991 | Lindsey et al. |

(Continued)

FOREIGN PATENT DOCUMENTS

CA 2184380 11/1995

(Continued)

OTHER PUBLICATIONS

AOL Using MLM for New Revenues, Newsbytes, (Jan. 14, 2009).*

(Continued)

*Primary Examiner* — Jason Dunham
(74) *Attorney, Agent, or Firm* — Brinks Hofer Gilson & Lione

(57) ABSTRACT

A recurring order management system and method for a computer network is disclosed. The system receives a request to suggest a recurring order for one or more products or services. The system generates a profile which stores the suggested products or services, the suggested recurrence for those products or services and the suggested quantities to deliver upon each recurrence. The order then automatically recurs one or more times according to the specified recurrence.

41 Claims, 25 Drawing Sheets

U.S. PATENT DOCUMENTS

| | | |
|---|---|---|
| 5,117,355 A | 5/1992 | McCarthy |
| 5,173,851 A | 12/1992 | Off et al. |
| 5,185,695 A | 2/1993 | Pruchnicki |
| 5,202,826 A | 4/1993 | McCarthy |
| 5,231,571 A | 7/1993 | D'Agostino |
| 5,233,514 A | 8/1993 | Ayyoubi et al. |
| 5,283,731 A | 2/1994 | Lalonde et al. |
| 5,287,268 A | 2/1994 | McCarthy |
| 5,289,371 A | 2/1994 | Abel et al. |
| 5,293,310 A | 3/1994 | Carroll et al. |
| 5,319,542 A | 6/1994 | King, Jr. et al. |
| 5,351,186 A | 9/1994 | Bullock et al. |
| 5,402,336 A | 3/1995 | Spiegelhoff et al. |
| 5,440,479 A | 8/1995 | Hutton |
| 5,475,585 A | 12/1995 | Bush |
| 5,483,445 A | 1/1996 | Pickering |
| 5,493,490 A | 2/1996 | Johnson |
| 5,528,490 A | 6/1996 | Hill |
| 5,537,314 A | 7/1996 | Kanter |
| 5,541,925 A | 7/1996 | Pittenger et al. |
| 5,548,110 A | 8/1996 | Storch et al. ............. 235/462.07 |
| 5,555,496 A | 9/1996 | Tackbary et al. |
| 5,557,518 A | 9/1996 | Rosen |
| 5,590,197 A | 12/1996 | Chen et al. ...................... 705/65 |
| 5,592,375 A | 1/1997 | Salmon et al. |
| 5,592,376 A | 1/1997 | Hodroff |
| 5,592,611 A | 1/1997 | Midgely et al. ................... 714/4 |
| 5,604,869 A * | 2/1997 | Mincher et al. .............. 709/232 |
| 5,621,201 A | 4/1997 | Langhans et al. |
| 5,621,797 A | 4/1997 | Rosen |
| 5,634,012 A | 5/1997 | Stefik et al. |
| 5,642,419 A | 6/1997 | Rosen |
| 5,655,089 A | 8/1997 | Bucci |
| 5,664,110 A | 9/1997 | Green et al. |
| 5,664,111 A | 9/1997 | Nahan et al. |
| 5,666,493 A | 9/1997 | Wojcik et al. |
| 5,671,279 A | 9/1997 | Elgamal |
| 5,678,041 A | 10/1997 | Baker et al. |
| 5,684,963 A | 11/1997 | Clement |
| 5,684,965 A | 11/1997 | Pickering |
| 5,694,551 A | 12/1997 | Doyle et al. |
| 5,696,898 A | 12/1997 | Baker et al. |
| 5,703,949 A | 12/1997 | Rosen |
| 5,708,780 A | 1/1998 | Levergood et al. |
| 5,710,887 A | 1/1998 | Chelliah et al. |
| 5,715,314 A | 2/1998 | Payne et al. |
| 5,715,399 A | 2/1998 | Bezos |
| 5,715,448 A | 2/1998 | Suzuki et al. |
| 5,724,424 A | 3/1998 | Gifford |
| 5,727,048 A | 3/1998 | Hiroshima et al. |
| 5,727,163 A | 3/1998 | Bezos |
| 5,732,400 A | 3/1998 | Mandler et al. |
| 5,734,838 A | 3/1998 | Robinson et al. |
| 5,737,539 A | 4/1998 | Edelson et al. |
| 5,740,549 A | 4/1998 | Reilly et al. |
| 5,742,931 A | 4/1998 | Spiegelhoff et al. |
| 5,745,681 A | 4/1998 | Levine et al. |
| 5,745,882 A | 4/1998 | Bixler et al. |
| 5,757,917 A | 5/1998 | Rose et al. |
| 5,758,327 A | 5/1998 | Gardner et al. |
| 5,758,328 A | 5/1998 | Giovannoli |
| 5,761,647 A | 6/1998 | Boushy |
| 5,761,648 A | 6/1998 | Golden et al. |
| 5,761,650 A | 6/1998 | Munsil et al. |
| 5,765,141 A | 6/1998 | Spector |
| 5,765,143 A | 6/1998 | Sheldon et al. |
| 5,774,670 A | 6/1998 | Montulli |
| 5,774,868 A | 6/1998 | Gragun et al. |
| 5,774,870 A | 6/1998 | Storey |
| 5,774,874 A | 6/1998 | Veeneman et al. |
| 5,781,632 A | 7/1998 | Odom |
| 5,784,565 A | 7/1998 | Lewine |
| 5,790,025 A | 8/1998 | Amer et al. |
| 5,790,677 A | 8/1998 | Fox et al. |
| 5,794,207 A | 8/1998 | Walker et al. |
| 5,794,210 A | 8/1998 | Goldhaber et al. |
| 5,794,234 A | 8/1998 | Church et al. |
| 5,794,395 A | 8/1998 | Reed |
| 5,794,396 A | 8/1998 | Gibbs |
| 5,794,399 A | 8/1998 | Searer |
| 5,796,393 A | 8/1998 | MacNaughton et al. |
| 5,796,841 A | 8/1998 | Cordery et al. |
| 5,799,284 A | 8/1998 | Bourquin |
| 5,802,497 A | 9/1998 | Manasse |
| 5,805,798 A | 9/1998 | Kearns et al. |
| 5,806,045 A | 9/1998 | Biorge et al. |
| 5,812,769 A | 9/1998 | Graber et al. |
| 5,822,736 A | 10/1998 | Hartman et al. |
| 5,825,881 A | 10/1998 | Colvin, Sr. |
| 5,825,884 A | 10/1998 | Zdepski et al. ................. 705/78 |
| 5,826,241 A | 10/1998 | Stein et al. |
| 5,826,242 A | 10/1998 | Montulli |
| 5,832,457 A | 11/1998 | O'Brien et al. |
| 5,832,482 A | 11/1998 | Yu et al. |
| 5,842,178 A | 11/1998 | Giovannoli |
| 5,845,267 A | 12/1998 | Ronen |
| 5,850,442 A | 12/1998 | Muftic |
| 5,850,446 A | 12/1998 | Berger et al. |
| 5,852,809 A | 12/1998 | Abel et al. |
| 5,857,175 A | 1/1999 | Day et al. |
| 5,864,822 A | 1/1999 | Baker, III |
| 5,864,823 A | 1/1999 | Levitan |
| 5,864,829 A | 1/1999 | Tago |
| RE36,116 E | 2/1999 | McCarthy |
| 5,870,716 A | 2/1999 | Sugiyama et al. |
| 5,870,717 A | 2/1999 | Wiecha |
| 5,870,718 A | 2/1999 | Spector |
| 5,870,733 A | 2/1999 | Bass et al. |
| 5,870,753 A | 2/1999 | Chang et al. |
| 5,878,139 A | 3/1999 | Rosen |
| 5,890,132 A | 3/1999 | Sanders |
| 5,892,900 A | 4/1999 | Ginter et al. |
| 5,893,076 A | 4/1999 | Hafner et al. |
| 5,893,098 A | 4/1999 | Peters et al. |
| 5,893,904 A | 4/1999 | Harris et al. |
| 5,895,454 A | 4/1999 | Harrington |
| 5,897,620 A | 4/1999 | Walker et al. |
| 5,897,622 A | 4/1999 | Blinn et al. |
| 5,897,639 A | 4/1999 | Greef et al. |
| 5,899,980 A | 5/1999 | Wilf et al. |
| 5,899,982 A | 5/1999 | Randle |
| 5,901,287 A | 5/1999 | Bull et al. |
| 5,903,652 A | 5/1999 | Mital |
| 5,903,877 A | 5/1999 | Berkowitz et al. |
| 5,903,878 A | 5/1999 | Talati et al. |
| 5,905,973 A | 5/1999 | Yonezawa et al. |
| 5,907,831 A | 5/1999 | Lotvin et al. |
| 5,909,023 A | 6/1999 | Ono et al. |
| 5,909,492 A | 6/1999 | Payne et al. |
| 5,909,671 A | 6/1999 | Byford et al. |
| 5,910,987 A | 6/1999 | Ginter et al. |
| 5,911,143 A | 6/1999 | Deinhart et al. |
| 5,915,019 A | 6/1999 | Ginter et al. |
| 5,915,243 A | 6/1999 | Smolen |
| 5,915,244 A | 6/1999 | Jack et al. |
| 5,918,014 A | 6/1999 | Robinson |
| 5,918,211 A | 6/1999 | Sloane |
| 5,918,213 A | 6/1999 | Bernard et al. |
| 5,918,214 A | 6/1999 | Perkowski |
| 5,918,215 A | 6/1999 | Yoshioka et al. |
| 5,918,228 A | 6/1999 | Rich et al. |
| 5,918,229 A | 6/1999 | David et al. |
| 5,920,861 A | 7/1999 | Hall et al. |
| 5,924,077 A | 7/1999 | Beach et al. |
| 5,924,080 A | 7/1999 | Johnson |
| 5,924,083 A * | 7/1999 | Silverman et al. ............. 705/37 |
| 5,926,798 A | 7/1999 | Carter |
| 5,930,764 A | 7/1999 | Melchione et al. |
| 5,930,767 A | 7/1999 | Reber et al. |
| 5,933,599 A | 8/1999 | Nolan |
| 5,937,390 A | 8/1999 | Hyodo |
| 5,937,391 A | 8/1999 | Ikeda et al. |
| 5,937,392 A | 8/1999 | Alberts |
| 5,937,393 A | 8/1999 | O'Leary et al. |
| 5,937,394 A | 8/1999 | Wong et al. |
| 5,940,807 A | 8/1999 | Purcell |
| 5,946,665 A | 8/1999 | Suzuki et al. |

| | | | |
|---|---|---|---|
| 5,948,061 A | 9/1999 | Merriman et al. | |
| 5,950,178 A | 9/1999 | Borgato | |
| 5,956,693 A | 9/1999 | Geerlings | |
| 5,956,695 A | 9/1999 | Carrithers et al. | |
| 5,956,699 A | 9/1999 | Wong et al. | |
| 5,960,411 A | 9/1999 | Hartman et al. | |
| 5,960,416 A | 9/1999 | Block | |
| 5,963,915 A | 10/1999 | Kirsch | |
| 5,963,925 A | 10/1999 | Kolling et al. | |
| 5,966,695 A | 10/1999 | Melchione et al. | |
| 5,970,469 A | 10/1999 | Scroggie et al. | |
| 5,970,470 A | 10/1999 | Walker et al. | |
| 5,970,471 A | 10/1999 | Hill | |
| 5,970,472 A | 10/1999 | Allsop et al. | |
| 5,970,473 A | 10/1999 | Gerszberg et al. | |
| 5,970,474 A | 10/1999 | LeRoy et al. | |
| 5,970,475 A | 10/1999 | Barnes et al. | |
| 5,983,200 A * | 11/1999 | Slotznick | 705/26.43 |
| 5,987,423 A | 11/1999 | Arnold et al. | |
| 5,987,429 A | 11/1999 | Maritzen et al. | |
| 5,987,498 A | 11/1999 | Athing et al. | |
| 5,991,735 A | 11/1999 | Gerace | |
| 5,991,736 A | 11/1999 | Ferguson et al. | |
| 5,991,738 A | 11/1999 | Ogram | |
| 5,991,739 A * | 11/1999 | Cupps et al. | 705/26.8 |
| 5,991,740 A | 11/1999 | Messer | |
| 5,995,942 A | 11/1999 | Smith et al. | |
| 5,995,943 A | 11/1999 | Bull et al. | |
| 5,996,001 A | 11/1999 | Quarles et al. | |
| 5,996,006 A | 11/1999 | Speicher | |
| 5,999,914 A | 12/1999 | Blinn et al. | |
| 5,999,915 A | 12/1999 | Nahan et al. | |
| 6,014,641 A * | 1/2000 | Loeb et al. | 705/34 |
| 6,029,141 A | 2/2000 | Bezos et al. | |
| 6,049,778 A | 4/2000 | Walker et al. | 705/14 |
| 6,115,690 A | 9/2000 | Wong | 705/7 |
| 6,134,533 A | 10/2000 | Shell | 705/26 |
| 6,219,692 B1 | 4/2001 | Stiles | 709/201 |
| 6,223,209 B1 | 4/2001 | Watson | 709/201 |
| 6,233,568 B1 * | 5/2001 | Kara | 705/410 |
| 6,249,773 B1 | 6/2001 | Allard et al. | |
| 6,282,517 B1 | 8/2001 | Wolfe et al. | 705/26 |
| 6,298,373 B1 | 10/2001 | Burns et al. | 709/203 |
| 6,370,580 B2 | 4/2002 | Kriegsman | 709/226 |
| 6,415,265 B1 | 7/2002 | Shell et al. | |
| 6,421,647 B1 | 7/2002 | Li | 705/1 |
| 6,578,010 B1 | 6/2003 | Teacherson | 705/14 |
| 6,684,189 B1 * | 1/2004 | Ryan et al. | 705/4 |
| 6,782,369 B1 | 8/2004 | Carrott | 705/1 |
| 2001/0034658 A1 | 10/2001 | Silva et al. | |
| 2001/0051905 A1 | 12/2001 | Lucas | |
| 2002/0059114 A1 * | 5/2002 | Cockrill et al. | 705/27 |
| 2002/0095345 A1 | 7/2002 | Panelli | 705/26 |

FOREIGN PATENT DOCUMENTS

| | | |
|---|---|---|
| CA | 2183274 | 2/1997 |
| CA | 2242874 | 7/1997 |
| CA | 2247479 | 8/1997 |
| CA | 2210281 | 2/1998 |
| CA | 2222229 | 7/1998 |
| CN | 1147875 | 9/1996 |
| CN | 1211330 | 8/1997 |
| EP | 0308224 | 3/1989 |
| EP | 0762692 A2 | 3/1997 |
| EP | 0812081 A2 | 12/1997 |
| EP | 0822535 A2 | 2/1998 |
| EP | 00844577 A2 | 5/1998 |
| EP | 0911745 A2 | 4/1999 |
| EP | 0921665 A2 | 6/1999 |
| JP | 5-250392 | 9/1993 |
| JP | 9319970 | 12/1997 |
| JP | H10-21304 | 1/1998 |
| JP | 9212549 | 3/1999 |
| JP | 11120241 | 7/1999 |
| NZ | 283103 | 2/1998 |
| WO | WO 92/10868 | 6/1992 |
| WO | WO 93/12489 | 6/1993 |
| WO | WO 95/21428 | 8/1995 |
| WO | WO 96/27155 | 9/1996 |
| WO | WO 96/36926 | 11/1996 |
| WO | WO 97/15885 | 5/1997 |
| WO | WO 97/22058 | 6/1997 |
| WO | WO 97/25801 | 7/1997 |
| WO | WO 97/26612 | 7/1997 |
| WO | WO 97/31321 | 8/1997 |
| WO | WO 98/09209 | 3/1998 |
| WO | WO 98/10381 | 3/1998 |
| WO | WO 98/14921 | 4/1998 |
| WO | WO 98/19224 | 5/1998 |
| WO | WO 98/19261 | 5/1998 |
| WO | WO 98/19262 | 5/1998 |
| WO | WO 98/20411 | 5/1998 |
| WO | WO 98/25220 | 6/1998 |
| WO | WO 98/28699 | 7/1998 |
| WO | WO 98/37675 | 8/1998 |
| WO | WO 98/40982 | 9/1998 |
| WO | WO 98/42123 | 9/1998 |
| WO | WO 98/49804 | 11/1998 |
| WO | WO 99/04326 | 1/1999 |
| WO | WO 99/04357 | 1/1999 |
| WO | WO 99/05612 | 2/1999 |
| WO | WO 99/07102 | 2/1999 |
| WO | WO 99/07121 | 2/1999 |
| WO | WO 99/09502 | 2/1999 |
| WO | WO 99/10850 | 3/1999 |
| WO | WO 99/19819 | 4/1999 |
| WO | WO 99/20013 | 4/1999 |
| WO | WO 99/23596 | 5/1999 |
| WO | WO 99/31602 | 6/1999 |
| WO | WO 99/33010 | 7/1999 |
| WO | WO 00/52617 | 9/2000 |

OTHER PUBLICATIONS

Fruit From Washington—Subscription Fruit Orders, obtained at http://www.fruitfromwashinston.com/fruit/subscription/subscribe.htm, pp. 1-2, Oct. 17, 2000.

Dean & Deluca, Holiday 2000, Tea Collecting.

PETsMART.com "What is the Frequent Fetcher™ Repeat Home Delivery Service?", obtained at http://www.petsmart.com/misc/regular_delivery.shtml, pp. 1-2, Mar. 5, 2001.

Jafra Cosmetics International, "Shop Online with Jan Lawrence", obtained at http://www.myjafra.com/catalog/skin_profiler1.cfm?id=460318, pp. 1-2, Feb. 26, 2001.

TAB Team (Top Achievers Business Team), Herbalife Sales and Marketing Plan, pp. 3-12.

Herbalife Today, News for Business Building, U.S. Edition No. 026, Jul./Aug. 1996, pp. 1-16.

US Herbalife Product Catalog © 2000 insert.

New Horizons "Enhancing the Lives of Those We Touch", US Melaleuca Mela Kit 1998, © Copyright by Melaleuca, Inc. 1997 Rev. 5/97 Printed in USA.

"Why Autoship", Nikken® US Retail Autoship, New Autoship Guidelines.

Nikken®, Nikken, Inc. Application for Retail Autoship.

Nikken®, Nihon Zenko Zoushin Kenkyukai, Canada Inc., Application for Retail Autoship.

Nikken®, Nihon Zenko Zoushin Kenkyukai, Canada Inc., Application for Wholesale Autoship.

Nikken®, Nihon Zenko Zoushin Kenkyukai, Canada Inc., Autoship/KenkoCom Promotion.

Inside Neways, Nov./Dec. '97, product catalog, pp. 1-31.

Neways, Inc., U.S.A. Fax/Purchase Order Form, Item #0194 Rev. Feb. 27, 1997.

Wisdom Wise, Neways Policies and Procedures #0005 Wise Distributor Manual, ©1998 Neways, Inc., pp. 1-38.

A New Way to Shop Nu Skin 1-888-4NUSKIN, Nuskin Fountain Club Policies and Procedures, © 1999 Nu Skin Enterprises, Inc.

NuSkin "Policies & Procedures" Manual for Distributors, pp. 1-30.

Automatic Delivery brochure, © 1996 Nu Skin International, Inc. and Interior Design Nutritionals.

Pharmanex® ADP "Automatic Delivery Program", ©1999 Pharmanex®.

Rexall® Showcase International®, Customer Autoship Agreement.

The Rexall® Compensation Plan brochure, Jul. 2000.

Glossary—of the Rexall® Compensation Plan explanation terms.
Usana® "Enjoy the Benefits of Autoship", #92020 USANA Autoship Benefits Brochure—Rev. 4.97.
Usana® Distributor Autoship Agreement, ©USANA, Inc. Form 9526 rev 1/97.
USANA® "Summary of Policies and Procedures" brochure.
Fast Growth Program, "Home Shopping Delivered" Automatic Product Replenishment Service brochure, ©1997 InterNET Services Corporation.
Distributor Cost Comparison Survey & Analysis—US, ©1991, 1997 InterNET Services Corporation. 3/97.
Amway® Products Delivered on *Your* Schedule brochure, ©1998 Amway Corporation, USA, Jul. 16, 1998.
Amway® Products Delivered on *Your* Schedule, Customer Order Worksheet, ©1998 Amway Corporation, USA, Jun. 24, 1998.
AOL Using MLM for New Revenues, Newsbytes, (Jan. 14, 1999).
AOL Using MLM for New Revenues (America Online is using Multi-Level Marketing, a program similar to that of Amwayu, to sell its new "AOL Select" service through Monument Communications), Newsbytes News Network (Jan. 14, 1999).
Amway puts direct selling model online (Amway to launch Quixtar.com web site in Sep. 1999 to sell variety of products) Marketing News, v33, n7, p. 12 (Mar. 29, 1999).
Amway—New Web-Based Business Opportunity Announced; To Launch Sep. 1, 1999 in the U.S. and Canada <http://www.amway.com/infocenter/pressrel/pressrel155.asp> (visited Mar. 26, 1999).
Arlen, Gary, Cyberselling: Shopping Comes to the Web, Response TV, p. 26 (Jul. 1995).
Avon, Mar. 1999 <http://www.avon.com/> (visited Mar. 29, 1999).
Bibliofind <http://www.bibliofind.com/cqi-bin/texis.exe/s/search> (visited Mar. 30, 1999).
Big Planet Incorporated, The Internet Working Company <<http://www.bigplanet.com/about/index.html>> (visited Mar. 29, 1999).
Compu-Dawn Changes Stock Symbol to ETVC' and Plans to Change Its Corporate Name to e.TV Commerce Industries, Inc., Business Wire, p. 1228 (Mar. 5, 1999).
CR2000 Announces Competition for Quixtar, Business Wire (Jul. 2, 1999).
Credit Systems International Inc. <http://www.stockgroup.com/csu.html> (visited Nov. 25, 1997).
Crossroads2000.net <http://www.crossroads2000.net/MainPage2.htm> (visited Jul. 9, 1999).
Cyberauthorize.com <http://www.cyberauthorize.com/> (visited Mar. 29, 1999).
Direct-Sales Firm Amway to Begin Marketing on Web (Amway Corp to launch online store called Quixtar on Sep. 1, 1999) Detroit Free Press, (Mar. 3, 1999).
DiRon Marketing and Wholesale <http://www.diron.com/> (visited May 14, 1999).
Dogpile <http://senqhor.dogpile.com/texis/search?q=shopping+carts&fs=web&to=thirty>(visited Mar. 30, 1999).
Duffy, Tom, Nu Skin's NT Server network gets a face-lift, PC Week, v. 13, n. 40, p. N22(2) (Oct. 7, 1996).
Equinox International <http://www.equinoxinternational.com/> (visited Apr. 20, 1999).
Eskow, Dennis, Amway of the Web, PC Week, v. 13, n. 50, P. A1 (2) (Dec. 16, 1996).
Fingerhut Executive Views Internet as Route to Expand, Save on Postage (Catalog retailer generates nearly $10 mil in sales from existing Internet site, expands by taking 20% stake in online florist business), Saint Paul Pioneer Press, (Aug. 2, 1998).
FutureNet Re-Enters Phone Service Resales, Newsbytes, P. New04100038, (Apr. 10, 1998).
Halpin, Jon, AOL Selects a Multilevel Marketing Partner, Computer Shopper, 19, 4, 107(1) (Apr. 1999).
Henry, Shannon, AOL Abandons Marketing Plan, Fear of Junk E-Mail kills Pyramid-Stule Sales Effort, The Washington Post, p. E3, (Feb. 23, 1999).
Hickey, Mary, Shopping at home: one modem line, no waiting (On-Line Connections-Exploring the Information Highway), Home PC, p. 307, (1994).
Holt, Paul, E-Commerce's toy story: new business strategies are required as electroic commerce gains in popularity and profitability, Communications News, v.35, n. 7, p. 34(2) (Jul. 1998).
Horizons Interactive Mall—Exceeding your shopping needs, <http://www.horizonsmall.com/> (visited Jul. 12, 1999).
Horizons Marketing Group Inc., <http://www.phoenix.net/~horizons/> (visited May 14, 1999).
Hu, Jim, AOL ends marketing scheme, jilting users, <http://www.news.com/News/Item/Textonly/0,25,32365,00.html> (visited Mar. 29, 1999).
www.instant pc.com, Total E-Business Solutions from Instant PC, <http://www.instantpc.com/>(visited Mar. 30, 1999).
Indermaur, Kurt, At Your Service, DMBS, v. 11, n. 10, p. 31(1), (Sep. 1998).
Internet Product Sales Up 500% At natural health Trends Corp.'s Kaire Subsidiary, Business Wire, p. 0082, (Mar. 16, 1999).
L., Bill, Van Name Catchings Mark, PC Week, 36(1) (Oct. 19, 1998).
Lang, Curtis, Cashing in: The rush is on to go buy and sell on the Internet, Advertising Age, p. 11, (Dec. 19, 1994).
Mary Kay, Online99, <http://www.marykay.com/> (visited Mar. 29, 1999).
Macavinta, Courtney, New York slams Net pyramids, <http://www.news.com/News/ItemiTextonly/0.25,19934,00.html> (visited Mar. 29, 1999).
McNaughton, Kora, E-commerce rocks direct-sales world, <http://www.news.com/News/Item/Textonly/0,25,31639,00.html> (visited Mar. 29, 1999).
Multilevel Marketing Plans, <http://www.ftc.gov/bcp/conline/publ/invest/m1m.htm>, (visited Mar. 29, 1999).
Megamarketing WWW, Income Opportunities, <http://www.mynflistore.com/opportunitv.htm>(visited Mar. 30, 1999).
Multilevel Marketing CEO Admits Entire Industry is Built on a Lie, Business Wire (Feb. 9, 1998).
MySiteInc.com, <http://www.mvsiteinc.com/cgi-bin/menu/webmaster/autoresponder.index.cg?dist=regroup>(visited Mar. 29, 1999).
Nets Inc. Expands Electronic Commerce Services for Industry, PR Newswire (Jan. 6, 1997).
Nu Skin Enterprises Announces Intent to Acquire Internet Company Big Planet and North American Affiliates, PR Newswire (Feb. 4, 1999).
OnlineSelect & You <http://members,tripod.com/onlineselectandyou/what.htm> (visited Mar. 29, 1999).
PR Newswire, Bidworld, Inc.: Internet Blast-Off Set for Oct. 1, (Sep. 10, 1996).
Pelline, Jeff, eBay named in patent suit, <http://www.news.com/News/ItemfTextonly/0,25,34271,00.html> (visited Mar. 29, 1999).
Persistent Client State HTTP Cookies, <http://home.netscape.com/newsref/std/cookie_spec.html> (visited Mar. 30, 1999).
Quixtar.com, New Web-Based business Opportunity Announced; To Launch Sep. 1, 1999 in the U.S. and Canada <http://www.amway.com/quixtar.asp> (visited Mar. 26, 1999).
RDI Marketing Launches Consolidation Plan in the Private Discount Club Industry, Business Wire, (Aug. 10, 1998).
Reuters, AOL goes for selective marketing, <http://www.news.com/News/Item/Textonly/0 24 30911 00.html> (visited Mar. 29, 1999).
Royal Body Care, <http://www.rbcglobenet.com/welcome/corporate.asp> (visited Apr. 20, 1999).
Salon, Amway joins the online multilevel marketing melee, <http://www.salonmagazine.com/21st/log/1999/03/01log.html> (visited Mar. 4, 1999).
Up2 technologies inc. Officially Launches UP2ME.Com—One of the Most Comprehensive Internet Navigational guides in the Industry, Business Wire (Jan. 21, 1999).
Vanilla, <http://www.vanilla-online.com/body_vanilla2.htm> (visited Mar. 29, 1999).
VHS Network beats Excell and Amway to the punch, Business Wire (May 13, 1997).
Walker, Leslie, Amway takes the E-Way, The Washington Post, (Mar. 25, 1999).
Walker, Leslie, Amway Takes the E-Way, The Washington Post, <http://www.washingtonpost.com/wp-srv/Wplate/1999-Mar. 25, 2761-032599-idx.html> (visited Mar. 26, 1999).

Wells, Melanie, Amway takes aim at Web, Home products company to route distributors to Quixtar site, USA Today, (May 11, 1999).

Woods, Bob, Plan to Sell AOL Via MLM Cancelled, Newsbytes (Feb. 17, 1999).

Amway Asia Pacific Hit by Direct Selling Ban in China, Amway Press Release (Apr. 22, 1998).

Karathanos, P., et al., Management Decision, vol. 32, No. 1, 1994, pp. 15-19, seventh paragraph.

The Majority Owned Subsidiary of Net LNNX Inc, Communications/USA has filed a listing application with the Pacific Stock Exchange and the SEC, NET LNNX press release, May 1, 1996, fifth paragraph.

Ostroff, J., Women's Wear Daily, Jul. 21, 1998, vol. 176, No. 14, p. 28.

The Amway Business Review, ©1999 Amway Corporation, USA.

Scott Harris MLM Compensation Plans, pp. 1-7, obtained at internet address, http://mlmstartup.com/articles/scotth.htm, Jun. 15, 2000.

Article, "China: Avon restarts operation after adjustment," Copyright 1998 China Daily. Source: World Reporter™ —Asia Intelligence Wire.

End-All™ homepage software features, obtained at http://endall.com Jul.11, 2001, 4 pages.

End-All™ Program help screens, 44 pages.

Amway Newsgram, USA "AMGRAM Standing Orders: Drop Shipping to Other Than Direct Distributor", Amway Corporation, Jun. 6, 1963.

Amway Corporation, Standing Order Form (L-920-SAD), 1988, USA, 2 pages.

Amway Corporation, Standing Order Form, Apr. 10, 1989, USA, 2 pages.

Amway Corporation, Standing Order Form, (SA-6971), 1989, USA, 2 pages.

Amway Priority Service Plus 1992-1993 brochure, "Discover hundreds of ways to simplify your life", Amway Corporation 1992, 37 pages.

Amgram advertisement for Audio/Video standing order, Amway Corporation, Amgram, pp. 32, Apr. 1992.

Amgram Automatic Filter Replacement Service article, Amway Corporation, Amgram, 5 pages.

Amway Automatic Shipment Agreement Program Order Form, (L-7375-SAA), 1994, 3 pages.

Wilson Enterprises, Inc. "Fast Growth" brochure, 1997, 36 pages.

Amway Scheduled Shipment Program Order Form/Contract (L-8489-SAA), Amway Corporation, 1996, USA. 2 pages.

Amway Scheduled Shipment Program, introducing the "Amway Scheduled Shipment Program for Double X®," Feb. 1997, 1 page.

Amway Corporation, introducing "Direct Delivery" brochure, 1997, USA, 24 pages.

Internet Services, Home Shopping Delivered™ Product Update, Sep. 1997, USA, 22 pages.

"Technology Buyers Guide", Fortune, Dec. 1, 1997.

English Translation of Japanese Application No. Hei 4-49783 "System for Automatically Generating a Repeat Order Record", filed Mar. 6, 1992.

Patent Abstract of Japanese Application No. JP-A-2000-250990 "Virtual Gift System and Gift System", date of publication Sep. 14, 2000, 1 page.

Patent Abstract of Japanese Application No. JP-A-H10-207940 "Network Shopping Device and Network Shopping Method", date of publication Aug. 7, 1998, 1 page.

Borland's Paradox for Windows User's Guide, Borland International, Inc., 1994.

Muller, Nathan J. Desktop Encyclopedia of the Internet, Artech House, Inc., 1998.

Hirschey, Mark, and Pappas, James L., Managerial Economics, $8^{th}$ Ed., The Dryden Press, Fort Worth, TX, 1996.

Greene, James H., Editor-in-Chief, Production and Inventory Control Handbook, $3^{rd}$ Ed., The McGraw-Hill Companies, Inc., 1997.

Dobler, Donald w. and Burt, David N., Purchasing and Supply Management, Text & Cases, $6^{th}$ Ed., The McGraw-Hill Companies, Inc., 1996.

Horngren, Charles T., and Sundem, Gary L., Introduction to Financial Accounting, Revised $3^{rd}$ Ed., Prentice-Hall, 1988.

Riley, David D., Data Abstraction and Structure, an Introduction to Computer Science II, Boyd and Fraser Publishing Company, 1987.

White, James J., and Summers, Robert S., Uniform Commercial Code, $4^{th}$ Ed., West Publishing Co., St. Paul, MN, 1995.

Restatement of the Law, Second, Contracts 2d, §§ 1-385 & their Comments, American Law Institute, St. Paul, MN, 1981.

Gavron, Jacqulyan, et al., How to User Microsoft Windows NT Workstation 4, Macmillian Computer Publishing, USA, 1996.

White, Ron, How Computers Work, Millennium Ed., Que Corporation, Sep. 1999.

Derfer, Frank J. et al, How Networks Work, Millennium Ed., Que Corporation, Jan. 2000.

Gralla, Preston, How the Internet Works, Millennium Ed., Que Corporation, Aug. 1999.

* cited by examiner

FIG. 8

SOP_SHIP_SCHED
- SHIP_MON_NO: SMALLINT NOT NULL
- OE_ITEM_NO: CHAR(10) NOT NULL (FK)
- OE_SZCLR_CD: CHAR(5) NOT NULL (FK)
- PFILE_NO: DECIMAL(10) NOT NULL (FK)
- SHIP_QTY_AMT: SMALLINT NOT NULL
- MAINT_DTM: TIMESTAMP
- MAINT_DEPT_NO: CHAR(6)
- MAINT_SOURC_ID: CHAR(6)
- MAINT_OPER_ID: CHAR(7)
- SHIP_ONE_TM_QTY: INTEGER
- MAINT_DISTB_NO: DECIMAL(11)

SOP_OE_ITEM
- PFILE_NO: DECIMAL(10) NOT NULL (FK)
- OE_ITEM_NO: CHAR(10) NOT NULL
- OE_SZCLR_CD: CHAR(5) NOT NULL
- OE_COST_IND_CD: CHAR(1) NOT NULL
- OE_SHIP_FREQ_CD: CHAR(2) (FK)
- OE_SHIP_INRVL_CD: CHAR(1) NOT NULL
- OE_START_SHIP_DT: DATE NOT NULL
- OE_RTAL_ACT_AMT: DECIMAL(7,2) NOT NULL
- OE_LAST_INV_NO: CHAR(11)
- OE_MAINT_DTM: TIMESTAMP
- OE_MAINT_DEPT_NO: CHAR(6)
- OE_MAINT_SOURC_CD: CHAR(6)
- OE_CORP_CD: CHAR(3) NOT NULL
- IM_ITEM_NO: CHAR(12) NOT NULL
- OE_PFX_ID: CHAR(3) NOT NULL
- OE_REV_CD: CHAR(3)
- OE_BOOK_CD: CHAR(3) NOT NULL
- OE_DESC_TXT: CHAR(25)
- OE_DISTB_COST_AMT: DECIMAL(9,2)
- OE_SUGG_CGST_AMT: DECIMAL(9,2)
- OE_PV_AMT: DECIMAL(9,2)
- OE_BV_AMT: DECIMAL(9,2)
- OE_QTY: SMALLINT NOT NULL
- OE_MAINT_OPER_ID: CHAR(7)
- OE_SHIP_END_DT: DATE
- PKG_ID: CHAR(5)
- PKG_ACCPT_CNTRC_FL: CHAR(1)
- PKG_CNTRC_PRC_FLG: CHAR(1) NOT NULL
- PKG_SHIP_CHRG_FLG: CHAR(1)
- PKG_SHP_COST_AMT: DECIMAL(9,2)
- PKG_SHIP_CHRG_PCT: DECIMAL(5,3)
- PKG_ITEM_SHP_QTY: DECIMAL(5) NOT NULL
- PKG_FULFL_QUAL_QTY: DECIMAL(5)
- PKG_FULFL_ITEM_NO: CHAR(10)
- PKG_FULFL_SZCLR_CD: CHAR(5)
- OE_CS_QTY: SMALLINT NOT NULL
- OE_CS_DISTB_AMT: DECIMAL(9,2) NOT NULL
- OE_CS_SUGG_AMT: DECIMAL(9,2) NOT NULL
- OE_CS_BV_AMT: DECIMAL(9,2) NOT NULL
- OE_CS_PV_AMT: DECIMAL(9,2) NOT NULL

ORD_PROD
- AMWAY_CNTRY_CD: CHAR(2) NOT NULL (FK)
- PROD_ORD_NO: CHAR(10) NOT NULL (FK)
- PROD_SZCLR_CD: CHAR(5) NOT NULL
- PROD_PRICE_AUDC_ID: CHAR(5) NOT NULL (FK)
- DIV_TYPE_CD: CHAR(1) NOT NULL
- PROD_EA_CS_CD: CHAR(1) NOT NULL
- PROD_PUB_DCOST_AMT: DECIMAL(9,2) NOT NULL
- PROD_PUB_SRTL_AMT: DECIMAL(9,2) NOT NULL
- ROW_UPDOT_DTM: TIMESTAMP
- PROD_P_SHIP_WGT_QTY: DECIMAL(5,2)
- PROD_DESC: CHAR(50) NOT NULL
- PROD_PUB_DESC: CHAR(75) NOT NULL
- PROD_LGL_NM: VARCHAR(255)
- BRAND_NM: CHAR(5)
- PROMO_ORD_PROD_FLG: CHAR(1) NOT NULL
- PROD_PUB_BV_AMT: DECIMAL(9,2) NOT NULL
- PROD_VEND_SHP_FLG: CHAR(1) NOT NULL
- ROW_UPDT_PROC_ID: CHAR(7)
- PROD_OWNER_ID: CHAR(7)
- PROD_AVAIL_FLG: CHAR(1) NOT NULL
- PROD_AVAIL_DT: TIMESTAMP
- PROD_PUB_PV_AMT: DECIMAL(9,2) NOT NULL
- PROD_TRUCK_SHP_FLG: CHAR(1) NOT NULL
- PROD_DRUM_FLG: CHAR(1) NOT NULL
- PROD_UPS_SHP_FLG: CHAR(1) NOT NULL
- PROD_UPS_AIR_FLG: CHAR(1) NOT NULL
- PROD_USPS_SHP_FLG: CHAR(1) NOT NULL
- PROD_SUBST_ORD_NO: CHAR(10)
- PROD_SUBST_SZCL_CD: CHAR(5)
- PROD_USES_STAT_FLG: CHAR(1) NOT NULL
- PROD_USES_PRMP_DES: CHAR(100) NOT NULL
- PROD_USES_UNIT_QTY: INTEGER NOT NULL
- PROD_USES_UM_DESC: CHAR(30) NOT NULL
- PROD_SUBST_ACTV_DT: DATE
- PROD_SUBST_INF_DT: DATE
- PROD_SUBST_AUTO_FL: CHAR(1) NOT NULL
- PROD_SUBST_MTC_FLG: CHAR(1) NOT NULL
- PROD_AVAIL_DT_FLG: CHAR(1) NOT NULL
- PROD_CS_QTY: SMALLINT NOT NULL
- PROD_CS_DCOST_AMT: DECIMAL(9,2) NOT NULL
- PROD_CS_SRTL_AMT: DECIMAL(9,2) NOT NULL
- PROD_CS_BV_AMT: DECIMAL(9,2) NOT NULL

SOP_PFILE
- PFILE_NO: DECIMAL(10) NOT NULL
- ORD_SYS_ID: CHAR(1) NOT NULL (FK)
- SHPTO_CONFD_FLG: CHAR(1) NOT NULL
- CNTRC_ACCPT_IMC_NO: CHAR(11)
- ORD_DISTB_NO: DECIMAL(11) NOT NULL
- ORD_DISTB_CNTRY_NO: DECIMAL(3) NOT NULL
- VOL_DISTB_NO: DECIMAL(11)
- ORD_DISTB_DD_NO: DECIMAL(11) NOT NULL
- DROP_SHIP_ADA_NO: DECIMAL(11)
- SHIP_TO_NM: CHAR(50)
- SHIP_TO_ADDR1_ADR: CHAR(50)
- SHIP_TO_ADDR2_ADR: CHAR(50)
- SHIP_TO_CITY_ADR: CHAR(50)
- SHIP_TO_ST_ADR: CHAR(2)
- SHIP_TO_ZIP_ADR: CHAR(10)
- SHIP_TO_PHONE_NO: DECIMAL(10)
- SHIP_TO_EMAIL_ADR: CHAR(100)
- SHIP_TO_DROP_CD: CHAR(3) NOT NULL
- SHIP_TO_WHSE_CD: CHAR(3) NOT NULL
- CUST_PAY_ID: CHAR(1) NOT NULL (FK)
- COST_IND_CD: CHAR(1) NOT NULL (FK)
- PAY_CD: CHAR(1) NOT NULL (FK)
- EXTRC_DAY_NO: SMALLINT NOT NULL
- LAST_EXTRC_DT: DATE
- ORGNL_ENTRY_DT: DATE NOT NULL
- PFILE_NTC_DT: DATE
- PFILE_TERM_DT: DATE
- CNTRC_DT: DATE
- CNTRC_RTURN_DT: DATE
- MAINT_DTM: TIMESTAMP
- MAINT_DEPT_NO: CHAR(6)
- MAINT_SOURC_ID: CHAR(6)
- PFILE_STAT_CD: CHAR(1) NOT NULL
- ORG_OPER_ID: CHAR(7)
- DO_ACS_CD: CHAR(1)
- OD_ACS_CD: CHAR(1)
- VOL_DISTB_ACS_CD: CHAR(1)
- CC_DECLN_STAT_QTY: SMALLINT
- PROMO_NO: INTEGER
- OLD_OO_NO: DECIMAL(11)
- OLD_VOL_DISTB_NO: DECIMAL(11)
- OLD_OO_DO_NO: DECIMAL(11)
- OLD_OO_DT: DATE
- OLD_VOL_DISTB_DT: DATE
- MBR_NO: CHAR(9)
- TRIM_ADV_BILL_CD: CHAR(1)
- TAX_EXMPT_CD: CHAR(1) NOT NULL
- SELECT_SHPMT_CD: CHAR(2)
- MAINT_OPER_ID: CHAR(7)
- SHPTO_IMC_NO: CHAR(11) NOT NULL
- AMWAY_BUS_IACT_CD: CHAR(1) NOT NULL (FK)
- DISTB_PRM_BUS_CD: CHAR(1) NOT NULL (FK)
- CNTRC_OL_DTTM: TIMESTAMP
- ORD_SYS_SOURC_ID: CHAR(1) (FK)
- MAINT_DISTB_NO: DECIMAL(11)
- INV_NO: CHAR(11) NOT NULL
- DITTO_ORD_EX_ST_CD: CHAR(1) NOT NULL (FK)

virtual office

HOME | Product Ordering  My Business  What's New  Services  Edit Profile  Logout | GO!

Welcome to
DittoDelivery | A complimentary service of Quixtar

Getting Started   Order Once...
The Benefits          Ditto Delivers!
FAQ's                    Ditto Delivery allows you to
What's New           schedule the products you use
                              the most like household
                              cleaners, personal care items,
                              food and nutritional products to
                              be delivered when you want then
                              each month. And you can
                              change your Ditto Delivery order
                              any time you like.

Create a new Ditto Delivery profile
for [myself ▽]  GO!

Manage a specific Ditto profile

Enter Profile Number: PR- [____] ▽  GO!
View/Update profile information

Manage my profile portfolio
View list of Ditto profiles  ▽  GO!

Fig. 12

Welcome to Ditto Delivery

Order Once...Ditto Delivers! Ditto Delivery allows you to schedule the products you use the most like household cleaners, personal care items, food and nutritional products to be delivered when you want then each month. And you can change your Ditto Delivery order any time you like.

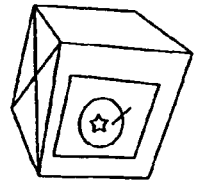

Getting Started · The Benefits · FAQ's · What's New

Create a new Ditto Delivery profile

○ Assessments
This copy explains what this is. This copy explains this is. Etc etc, etc, etc, etc....

○ Pre-Definied template
This copy explains what this is. This copy explains what this is. Etc etc, etc, etc, etc ◉ Do it yourself
This copy explains what this is. This copy explains what this is. Etc etc, etc, etc, etc ◉ Myself
○ Someone else (GO)

View my personal Ditto Profile (GO)

Manage a customer or downline Ditto profile

Enter Profile Number: PR-[    ]  [View/Update profile information ▽]  (GO)

Manage my profile portfolio

Select options: [View list of Ditto profiles ▽]  (GO)

Fig. 13

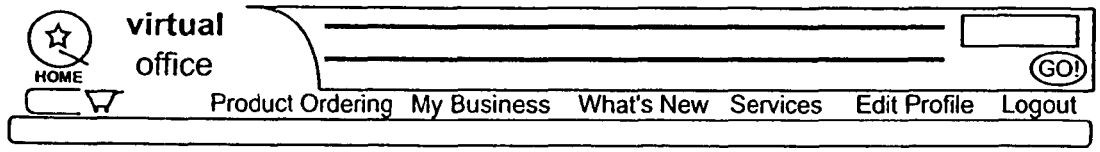

 | GETTING STARTED

The Benefits

FAQs

What's New

Ditto Home

Ready to make your life easier and your business more manageable?

We've got a great way for you to do it Ditto Delivery a complimentary service of Quixtar.

On a personal level. Ditto Delivery helps make your life easier. With it you can automatically have the household, personal care products and nutritional products you and your family use the most -- delivered directly to your home, office... wherever you like. Consistently. On time, and according to a schedule you created and can change at any time. To get started, all you need to do is create your Ditto Delivery Profile.

Business-wise, the features and benefits of Ditto Delivery help you organize your business better. And, the benefits are so great promoting it to your customers is simple.

The best way to get your business on board with Ditto Delivery is...

1. Go through the "learning process" by checking out More Benefits and the FAQs and about Ditto Delivery.

2. Do Ditto Delivery yourself. Set up your own profile. Explore all it has to offer you as a customer and an IBO.

3. Once you see how convenient it is, tell your friends and neighbors about it. Show them how to set up their own Ditto Delivery profile or set one up for them.

TOP

Fig. 14

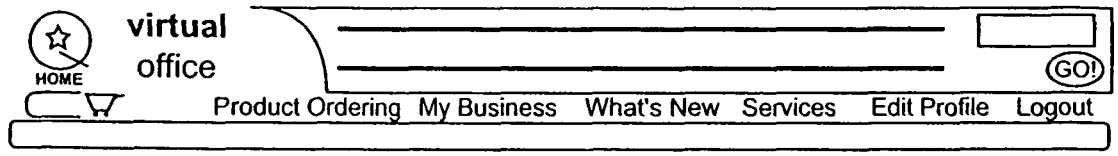

 | THE BENEFITS

The Benefits

FAQs

What's New

Ditto Home

The Process is Easy...The Benefits Can't be Beat...Ditto Delivery

Ditto Delivery makes running your business easier. It gives you everything your need to put you in the know.

As an IBO, Ditto Delivery lets you:

- Create and change your own profile, and time right here on Quixtar.
- View and manager your own profile at will
- View Ditto Delivery profits for your group.
- Review your order history plus that of your group and your customers.
- Project your volume, earning potential and PV/BV by viewing upcoming Ditto Delivery schedules.
- Maintain your groups privacy while enjoying the convenience of a Profile Maintaining Overview that tells you past events, and who made changes to each profile.
- Review Profile History (up to three months) so you have to remember less...
- Know that these important documents are more secure than they would ever be in your cabinet.
- Run monthly reports containing total profiles, costs, margins, PV/BV, the five most profitable profiles in your group, the five that may need a bit of help and more.

Ditto Delivery is also easy to promote. That's because Quixtar automatically reminds your customers of this service at checkout, each time they purchase a wide variety of the products they use everyday.

And the convenience of the program sells itself. Besides allowing customers automatic delivery of the products they use every day. Ditto Delivery also allows your customer total freedom to access and change their profile, whenever they want. Which means you do less while you each more.

If you wish to set up your Ditto Delivery profile at this time, please click here. Or access FAQs about the program.

TOP

Fig. 15

 DittoDelivery Profile Detail          Profile # PR-1010

Change Shopping/Billing Info ▽

|  |  |  |  |
|---|---|---|---|
| Status : | Active | Ship to: | Little Lewis Test |
| Ordering IBO: | 816994 |  | 123 Main & Oak St. |
| Volume IBO: | 816991 |  | ADDR2MQ2 |
| Platinum IBO: | 2003999 |  | Cleveland OH 44130 |
| Ship to IMC: | 2185 | Phone: | 4412399198 |
| Process day of month: | 19 | E-mail: | TEST1@AMWAY.COM |
| Date last processed: | 9/26/00 | CC#: | 000004111111111119 |
| Shipping method: | Standard | Exp. date: | 200010 |
| Profile origin date: | 9/4/97 | CC holder name: | TEST786 |

Change Product Schedule ▽

| SKU 52:Cif | Description | Start | Jan | Feb | Mar | Apr | May | Jun | Jul | Aug | Sep | Oct | Nov |
|---|---|---|---|---|---|---|---|---|---|---|---|---|---|
| A0382 | Food Supp Trim Advant PAC | Dec 1999 | 8 | 2 | 2 | 7 | 0 | 0 | 6 | 3 | 3 | 2 | 2 |
| E0001 | Liquid Org Clnr Reg Qt | Jul 2000 | 0 | 2 | 0 | 0 | 0 | 0 | 0 | 0 | 0 | 0 | 0 |
| E0003 | Bioquest II | Aug 1999 | 3 | 1 | 1 | 3 | 1 | 1 | 1 | 1 | 1 | 1 | 1 |
| E1245 | Cleartrak Maint System | Aug 1999 | 0 | 1 | 0 | 0 | 0 | 0 | 0 | 0 | 0 | 0 | 0 |
| E2164 | Body Sers Body Wash IL | Aug 1999 | 0 | 0 | 0 | 1 | 0 | 0 | 0 | 0 | 0 | 0 | 0 |
| E3880 | Pursue Disinfectant 10L | Aug 1999 | 0 | 0 | 0 | 0 | 1 | 4 | 0 | 0 | 0 | 6 | 0 |
| E4888 | Strive Bar Apple | Aug 1999 | 0 | 0 | 0 | 0 | 3 | 0 | 0 | 4 | 4 | 0 | 6 |
| E8309 | Queen Cookware Set | Aug 1999 | 1 | 0 | 0 | 0 | 0 | 0 | 0 | 0 | 0 | 0 | 0 |
| E8456 | Liq Org Clnr Suds 2.5 Gal. | Aug 2000 | 0 | 1 | 0 | 0 | 0 | 0 | 2 | 0 | 0 | 0 | 0 |
| AD0270 | Pursue Bowl Caddie & Mop | Oct 1999 | 0 | 0 | 1 | 0 | 0 | 0 | 0 | 0 | 0 | 0 | 0 |
| AL0451 | Cleartrak Floor Cln Hose | Aug 1999 | 1 | 0 | 1 | 0 | 1 | 0 | 1 | 0 | 0 | 0 | 1 |
| AL6680 | ***Product No Longer Ava | Aug 1999 | 0 | 0 | 0 | 0 | 2 | 0 | 0 | 0 | 0 | 0 | 0 |
| WA0193 | Food Supp Lead Edge Heart | Aug 1999 | 0 | 3 | 0 | 0 | 0 | 0 | 0 | 0 | 0 | 0 | 0 |
| WA4205 | Food Supp Natural B-100'S | Aug 1999 | 2 | 2 | 2 | 2 | 2 | 2 | 2 | 2 | 2 | 2 | 2 |
| WA4211 | Food Supp Bio C PLS-300'S | Aug 1999 | 2 | 2 | 2 | 2 | 2 | 2 | 2 | 2 | 2 | 2 | 2 |
| WA4230 | Food Supp Daily 180'S | Jul 2000 | 0 | 1 | 0 | 0 | 0 | 0 | 0 | 0 | 0 | 0 | 0 |
| WA4261 | Food Supp Parselenium E | Aug 1999 | 2 | 2 | 2 | 2 | 2 | 2 | 2 | 2 | 2 | 2 | 2 |
| WA4285 | Food Supp Nutriedge | Aug 1999 | 2 | 2 | 2 | 2 | 2 | 2 | 2 | 2 | 2 | 2 | 2 |
| WA4300 | Food Supp Double X | Oct 2000 | 2 | 0 | 0 | 0 | 0 | 0 | 0 | 0 | 0 | 0 | 0 |
| WA5688 | Food Supp Prof Alpha Chew | Aug 1999 | 2 | 0 | 0 | 0 | 0 | 0 | 0 | 0 | 0 | 0 | 0 |
| WA5880 | Food Supp Cal Mag | Aug 1999 | 0 | 2 | 0 | 0 | 0 | 0 | 0 | 0 | 0 | 0 | 0 |
| WA5985 | Food Supp-Ginseng W/Ginkg | Aug 1999 | 0 | 0 | 2 | 0 | 0 | 0 | 0 | 0 | 0 | 0 | 0 |
| WA8058 | Food Supp Multicarotene | Aug 1999 | 2 | 2 | 2 | 2 | 2 | 2 | 2 | 2 | 2 | 2 | 2 |
| WS0003 | Sab Bioquest II | May 2000 | 1 | 0 | 0 | 0 | 0 | 0 | 0 | 0 | 0 | 0 | 0 |
| WS2525 | Home Care Action Pak | Aug 1999 | 2 | 2 | 2 | 2 | 2 | 2 | 2 | 2 | 2 | 2 | 2 |
| SOP5499 | Alum Foil-New Config | Oct 2010 | 1 | 1 | 1 | 1 | 1 | 1 | 1 | 1 | 1 | 1 | 1 |
| SKU 52:Cif | Description | Start | Jan | Feb | Mar | Apr | May | Jun | Jul | Aug | Sep | Oct | Nov |

Fig.16

 DittoDelivery Profile Customer Info Add       Profile # PR-00000000000

You're on your way to a simpler life! Just complete the following information so we'll know where to send your merchandise, (and, of course, how to bill you for it!). When finished, click the "Add Profile" button at the bottom of the page.

IBO Information

Ordering IBO #: [          ]

Volume IBO #: [          ]

Profile Information

Status: [Active ▽]

Process day of month*: [19 ▽]

*This is the day we create your order, which will then ship based on the shipping method selected below.

Shipping method*: [Standard          ]

*Standard will ship on your weekly cycle delivery day. UPS select ships the next business day.

Client or Ship-To Information

Ship-to IMC* #: [816991          ]

*If this is a current IBO, Member, or Client - please enter their Ship-to IMC number.

Ship-to Name: [Linda Holliway          ]

Address Line 1: [240-A W. Day-Yel Springs] (1st line, No. P.O. Box please)

Address Line 2: [          ] (2nd line - if needed)

City/Town: [Grand Rapids          ]

State/Province: [MI          ]

Zip/Postal Code: [          ]

Phone Number: [6162345678          ]

Customer E-mail: [NO_EMAIL@QUIXTAR.COM          ]

Billing Information

Card Number: [          ] (Please enter the entire number - without spaces)

Expiration Date: [10 ▽] [2000 ▽]

Cardholder's Name: [          ]

Fig. 17

Please read the following before confirming your Ditto Delivery order:

TERMS - 1 (LINDA HOLLWAY) hereby authorize Quixtar to ship the items indicated on this profile and items on any supplemental order or change/modification orders, which are incorporated herein by reference, or as otherwise requested by me or on my behalf. ON A RECURRING BASIS at the intervals indicated and to change this credit card account the current price at the line of shipment. In the event an item ordered becomes unavailable or is replaced with a new item formulation. I agree to permit Quixtar to substitute a substantially similar item at the same or slightly additional cost not to exceed 10% of the substantial item's cost. PRICES AND ITEM FORMULATIONS ARE SUBJECT TO CHANGE WITHOUT NOTICE. I understand that these ordered items will continue to be shipped at intervals indicated and that I am obligated to pay for them until I cancel or modify my order. Quixtar reserves the right to cancel this order at any time.

PURCHASER'S RIGHT TO CANCEL/MODIFY ORDER - You have the right to cancel/modify this order at any time online with Quixtar.

[ADD PROFILE]

(Top of Page)

Fig. 18

Search [ ] GO

THURSDAY
Apr 13, 2000

VIEW CART | what's new | ordering | office | customer service | edit profile | change view Welcome to
Ditto Delivery
a complimentary service of Quixtar

Getting Started - The Benefits - FAQs - What's New

Ditto Delivery allows you to schedule the products you use the most, like household cleaners, personal care items, food and nutritional products to be delivered when you want them each month. And, you can change your Ditto Delivery order any time you like.

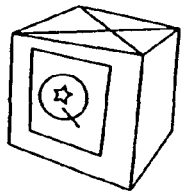

| Create a new Ditto Delivery Profile |
|---|
| ○ Assessments<br>Loremipsum dolor sit amet consectetuer adipiscing elit, sed diem nonummy nibh euismod tincidunt ut lacreet dolore magna aliguam erat volutpat. Ut wisis enim ad minim veniam, quis nostrud exerci. |
| ○ Pre-Defined template<br>Loremipsum dolor sit amet, consectetuer adipiscing elit, sed diem nonummy nibh euismod tincidunt ut lacreet dolore magna aliguam erat volutpat. Ut wisis enim ad minim veniam, quis nostrud exerci. |
| ○ Do it yourself<br>Loremipsum dolor sit amet, consectetuer adipiscing elit, sed diem nonummy nibh euismod tincidunt ut lacreet dolore magna aliguam erat volutpat. Ut wisis enim ad minim veniam, quis nostrud exerci.<br>✓ My Self / Someone else  GO |

| View my personal Ditto profile |
|---|
| Loremipsum dolor sit amet, consectetuer adipiscing elit, sed diem.  GO |

| Manage a customer or downline Ditto profile |
|---|
| Enter Profile Number PR-[ ]<br>✓ View/Update profile information  GO<br>View maintenance history<br>View annual projection<br>View order history |

| Manage my profile portfolio |
|---|
| Select option: ✓ View list of Ditto profiles  GO<br>View personal portfolio statistics<br>View group portfolio statistics |

Fig. 19A

Ditto Delivery
Getting Started - The Benefits - FAQs - What's New

Assessment Questions

Please answer the following questions which will help us in developing Ditto Delivery profile just for you...

| Household Size | |
|---|---|
| 001. Number of makes, 16 years or older? | None |
| 002. Number of females, 15 years or older? | None |
| 003. Number of boys between 4 years and 15 years? | None |
| 004. Number of girls between 4 years and 15 years? | None |

| Residence Type/Layout | |
|---|---|
| 001. Number of bathrooms? | None |
| 002. Approximately how many square feet is your house? | Less than 1,500 |
| 003. What percentage of your floors in linoleum? | None |

| General Cleaning | |
|---|---|
| 001. Do you use a counter top cleaner? | No |
| 002. Does your home have an automatic dishwasher? | No |
| 003. Does your home have soft water? | No |

[ Submit Assessment ]

(Top of Page)

Fig. 20A

Ditto Delivery
Packages and Templates
Getting Started - The Benefits - FAQs - What's New

| Here's a list of available Packages and Templates. |
|---|

Artistry Becomes You
This template contains the best products Quixtar has to offer
Artistry Line.

The Best of the Best
This is the best of template it contains the best coreline products Quixtar
has to offer.

DINKS (Dual Income - no kids)
This is the family of 2 templates as is great for families of 2 who have 2
people living in the same house and need 2 times as much stuff as a single
family may need to keep clean and fresh and...

Family of Four
This is the family of 4 template as is great for families of 4 who have 4
people living in the same house and need 4 times as much stuff as a single
family may need to keep clean and fresh and...

Single Profile Template Product Bundle
This is the single template and is geared towards household cleaning.

The Best of the Best
This is the best of template it contains the best coreline products Quixtar
has to offer.

DINKS (Dual Income - no kids)
This is the family of 2 templates as is great for families of 2 who have 2
people living in the same house and need 2 times as much stuff as a single
family may need to keep clean and fresh and...

Family of Four
This is the family of 4 templates as is great for families of 4 who have 4
people living in the same house and need 4 times as much stuff as a single
family may need to keep clean and fresh and...

Single - Profile Template Product Bundle
This is the single template and is geared towards household cleaning.

Family of Four
This is the family of 4 templates as is great for families of 4 who have 4
people living in the same house and need 4 times as much stuff as a single
family may need to keep clean and fresh and...

Fig.21A

Here are the suggested contents of your customized Ditto Delivery profile.

| SKU ez/clr / Description | Nov. | Dec | Jan | Feb | Mar | Apr | May | Jun | Jul | Aug | Sep | Oct |
|---|---|---|---|---|---|---|---|---|---|---|---|---|
| Z1775 TOILET TISSUE | 1 | 0 | 0 | 0 | 0 | 0 | 0 | 0 | 1 | 0 | 0 | 0 |
| WA4300 FOOD SUPP DOUBLE X | 1 | 1 | 1 | 1 | 1 | 1 | 1 | 1 | 1 | 1 | 1 | 1 |
| WE0003 SAB BIOQUEST II | 1 | 0 | 0 | 0 | 0 | 1 | 0 | 0 | 0 | 0 | 0 | 0 |
| WE0799 PREWASH LAUNDRY SPRAY | 1 | 1 | 0 | 1 | 1 | 0 | 1 | 1 | 0 | 1 | 1 | 0 |
| WE2166 BODY SERIES DEO STICK | 1 | 1 | 0 | 1 | 1 | 0 | 1 | 1 | 0 | 1 | 1 | 0 |
| WE2170 4 IN 1 FAMILY BAR SOAP | 1 | 1 | 1 | 1 | 1 | 1 | 1 | 1 | 1 | 1 | 1 | 1 |
| WE2171 BODY SERS LIQ HAND SOAP | 1 | 0 | 1 | 0 | 1 | 0 | 1 | 0 | 1 | 0 | 1 | 0 |
| WE9095 DISH DROPS 1 LITTER | 1 | 0 | 0 | 0 | 1 | 0 | 0 | 0 | 1 | 0 | 0 | 0 |
| WE9390 CRYS BRT DISHWASHER 3 LB | 1 | 1 | 1 | 1 | 1 | 1 | 1 | 1 | 1 | 1 | 1 | 1 |
| WE9530 GLISTER FLUORIDE TTHPST | 1 | 1 | 0 | 1 | 0 | 1 | 1 | 0 | 1 | 1 | 0 | 0 |

| SKU ez/clr / Description | Nov. | Dec | Jan | Feb | Mar | Apr | May | Jun | Jul | Aug | Sep | Oct |
|---|---|---|---|---|---|---|---|---|---|---|---|---|
| Total Items | 10 | 6 | 4 | 6 | 8 | 5 | 7 | 5 | 7 | 6 | 6 | 3 |
| Total Cost | $131.50 | $82.35 | $72.15 | $82.35 | $109.85 | $89.20 | $86.95 | $78.50 | $102.75 | $82.35 | $83.10 | $67.55 |
| Total PV | 54.52 | 38.95 | 34.65 | 38.95 | 45.92 | 41.45 | 40.75 | 37.55 | 42.62 | 38.95 | 39.35 | 32.85 |
| Total BV | 136.15 | 98.50 | 87.55 | 98.60 | 114.35 | 104.85 | 103.10 | 95.00 | 106.00 | 98.80 | 99.50 | 93.05 |

Note: It is possible to add products once profile has been accepted

[Accept Product Schedule] [Decline Product Schedule] [Edit Product Schedule] [Balance Schedule]

Fig. 22

SYSTEM AND METHOD FOR MANAGING RECURRING ORDERS IN A COMPUTER NETWORK

RELATED APPLICATIONS

This application is a continuation of U.S. patent application Ser. No. 09/714,774, filed Nov. 16, 2000, now U.S. Pat. No. 7,353,194 which is a continuation-in-part under 37 C.F.R. § 1.53(b) of U.S. patent application Ser. No. 09/515,860, filed Feb. 29, 2000 now U.S. Pat. No. 6,980,962, the entire disclosure of which is hereby incorporated by reference, which claims priority under 35 U.S.C. § 119(e) to U.S. Provisional Application Ser. No. 60/122,385, filed Mar. 2, 1999 and U.S. Provisional Application Ser. No. 60/126,493, filed Mar. 25, 1999.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Whether speaking of traditional brick and mortar commerce or electronic commerce, often the key to making or losing a sale comes down to customer convenience. A consumer is less likely to make a purchase if it is inconvenient for him or her to do so. The mail/phone order catalog industry is based on the premise that it is more convenient for a user to shop from home and have their purchases delivered than for them to visit a store.

However, beyond making that first sale, retailers attempt to generate repeat sales to previous customers to keep their businesses viable. The better the first shopping experience is for a customer, the more likely the customer will make subsequent purchases.

Automated repeating order systems have been implemented to increase customer loyalty. Such systems include negative response systems such as record/compact disc clubs which send out a different product, i.e. a different recording, on a fixed interval, e.g. monthly, if the consumer fails to return a response card. Negative response systems also include systems wherein a user agrees to purchase a specified dollar amount in products or services. Where the user fails to meet the specific amount for the given interval, the system automatically ships products or services to make up the difference. Other repeat order systems include "product of the month" systems which deliver a different product, selected from a category of products, every month. These systems include flower of the month or fruit of the month which deliver a different variety of the product every month for a specific number of months.

The problem associated with the above repeating order systems is that they are structured to provide vendor convenience over consumer convenience. Such systems derive benefit for the vendor from the inconvenience to the consumer involved in returning the response cards, returning the unwanted products or meeting minimum purchase requirements. Often, consumers receive unwanted products but do not want to deal with the hassles of returning the products or stopping the shipments. Further, these systems fail to reduce the number of shopping experiences for the consumer because they are usually associated with vendors which offer a limited product selection.

In electronic commerce, consumers have convenient access to products and services offered by multiple vendors, also known as "e-tailers", on the Internet. With the click of a mouse, a particular consumer can jump from one web site to another. They may do this for a myriad of reasons, including obtaining a marginally lower price, obtaining an incentive offer or just because the first web site was too inconvenient to navigate. In addition, establishing repeat customers at a particular web site for items which are used again and again is proving difficult. Web retailers have more success with one-time purchases, typically for durable goods such as books, gifts, or airline tickets, than with repeat purchases, typically for consumable goods such as detergent, deodorant or shampoo. Obtaining and particularly retaining customers has become an important issue as the electronic commerce industry matures.

Electronic commerce retention strategies include streamlining web site designs, improving customer service and improving product selection. Typically, a strategy for streamlining a web site includes simplifying the navigation, organizing the content, and simplifying the order entry and processing. An example of such a strategy is described in U.S. Pat. No. 5,960,411 which discloses a 1-click ordering system which allows repeat customers to order products with one operation. However, further or different retention strategies may better maintain a customer's loyalty for future purchases.

Accordingly, there is a need to increase the convenience of purchasing products and services in the electronic commerce environment. Specifically there is a need to improve the convenience for making purchases from one or more electronic commerce vendors to improve the acquisition of new customers and the retention of existing customers through a reduction in consumer frustration, costs and resources associated with the shopping experience.

BRIEF DESCRIPTION OF THE DRAWINGS

FIG. 8 depicts first preferred profile database tables for use with the recurring order management system of FIG. 2.

FIG. 12 depicts a first preferred interface screen for the recurring order management system of FIG. 2.

FIG. 13 depicts a second preferred interface screen for the recurring order management system of FIG. 2.

FIG. 14 depicts a first preferred descriptive screen for the recurring order management system of FIG. 2.

FIG. 15 depicts a second preferred descriptive screen for the recurring order management system of FIG. 2.

FIG. 16 depicts a first preferred confirmation/modification interface screen for the recurring order management system of FIG. 2.

FIG. 17 depicts a first preferred profile data entry interface screen for the recurring order management system of FIG. 2.

FIG. 18 depicts a first preferred profile confirmation screen for the recurring order management system of FIG. 2.

FIGS. 19A-B depict a third preferred interface screen for the recurring order management system of FIG. 2.

FIGS. 20A-B depict a first preferred assessment interface screen for the recurring order management system of FIG. 2.

FIGS. 21A-B depicts a first preferred packages/templates interface screen for the recurring order management system of FIG. 2.

FIG. 22 depicts a second preferred confirmation/modification interface screen for the recurring order management system of FIG. 2.

DETAILED DESCRIPTION OF THE DRAWINGS AND THE PRESENTLY PREFERRED EMBODIMENTS

The preferred embodiments relate to a standing/recurring order management system which allows a consumer to set up a standing order for products or services. The standing order automatically repeats according to a recurrence pattern specified by the user. Selected products or services are sent to the user, i.e. fulfilled, at regular intervals based on the recurrence pattern. The system facilitates the establishment of long term orders, enhancing consumer convenience and loyalty. While the embodiments are discussed in relation to individual consumers, the embodiments are applicable to any entity which purchases products or services including, but not limited to, industrial purchasers, electronic commerce retailers/wholesalers, brick and mortar retailers/wholesalers and direct sales retailers/wholesalers. Products and services include, but are not limited to, consumer products or services intended as inventory or for end user consumption and industrial products or services, including consumable and durable goods or services.

A problem with most web selling strategies is that, while the customer's visit to the electronic store-front may be pleasant, the customer still has to visit every time they wish to make a purchase, often for the same item, again and again. Where a particular customer buys multiple products from multiple vendors, they must repeatedly visit multiple web sites and undertake the purchasing process at each web site. Wherein each web site may offer a convenient shopping experience, that convenience is lost in the multitude of shopping experience that the consumer must undertake to complete their shopping needs. This may lead to customer frustration and ultimately the loss of that customer to one or more electronic commerce vendors or to traditional brick and mortar retailers. Where a particular customer is actually a business which purchases their inventory, office supplies, etc. from electronic commerce based vendors, executing repeated purchases from multiple vendors results in increased costs and wasted resources. Accordingly, there is a need to reduce the number of shopping experiences in a customer's life in order to make shopping on the web truly convenient.

Figure 1:
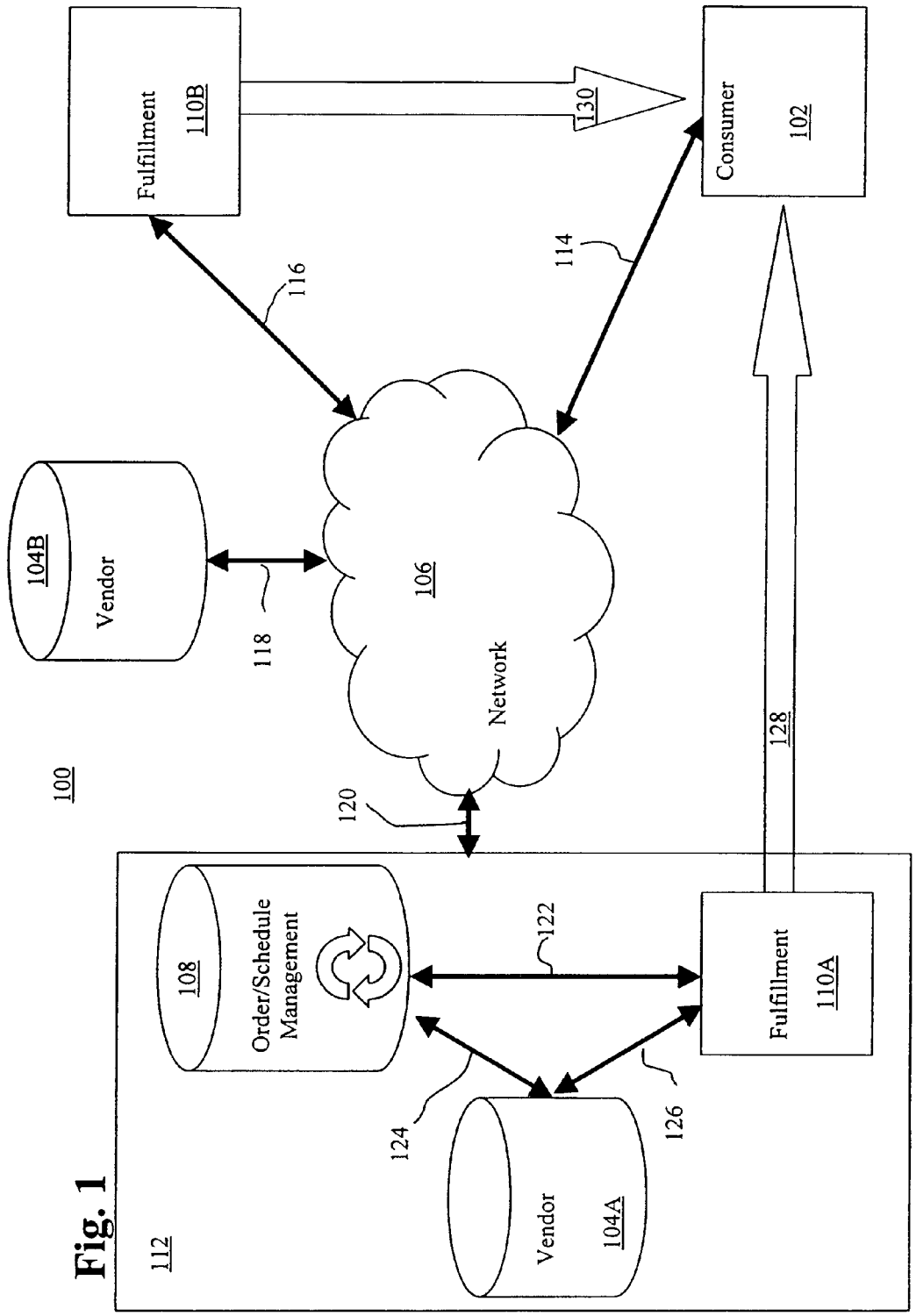
FIG. 1 depicts a block diagram of a preferred embodiment of a recurring order management system.

Referring now to FIG. 1, there is shown a recurring order system 100 which allows a consumer 102 to set up a standing order for one or more products or services offered by an electronic commerce vendor 104A, B via a network 106 with a recurring order management system 108. The system 108 causes the standing order to recur at an interval. Upon each recurrence, the standing order is transmitted to a fulfillment entity 110A, B which fulfills the standing order to the customer 102. The recurring order management system 108 is preferably implemented on one or more server computers coupled with the network 106.

In the preferred embodiment, the consumer 102 includes an individual consumer (single person or family) having a personal computer, such as a Pentium III based personal computer or equivalent manufactured by Intel Corporation, located in Santa Clara, Calif., running the Windows 98 operating system, manufactured by Microsoft Corporation, located in Redmond, Wash., and having a browser program, such as Internet Explorer version 5.0, also manufactured by Microsoft Corporation or Netscape Navigator, manufactured by Netscape Communications Corporation, located in Mountain View, Calif. Other personal computers, operating systems and browser programs may be used.

The consumer 102 is coupled with the network 106, which is preferably the Internet, so as to be able to browse and interact with web sites, also coupled with the Internet, using the browser program. Such web sites include sites provided by the electronic commerce vendors 104A, B (described below). Herein, the phrase "coupled with" is defined to mean directly connected to or indirectly connected with through one or more intermediate components. Such intermediate components may include both hardware and software based components. In an alternative embodiment, the consumer 102 may use a telephone to communicate with an operator that is linked with the recurring order management system 108 on behalf of the consumer 102.

In an alternative embodiment, the consumer 102 is a business or corporation or representative thereof and may include business to business procurement management systems. Further, the consumer 102 may include independent direct sales business owners of a multi-level marketing organization. In addition, the network 106 may be a different type of publicly accessible network, such as a cable or satellite network, a private network such as a subscription based network, e.g. America On-Line, an intranet or a private extranet, or combinations thereof.

The electronic commerce vendor 104A, B is preferably a web site based vendor of products and/or services. In one embodiment, the vendor 104A, B is the Quixtar web site, provided by Amway Corporation, located in Ada, Mich. and accessible at http://www.quixtar.com. In this embodiment, the vendor 104A, B is affiliated with a multilevel marketing organization which enrolls participants as clients, members or independent business owners ("IBO"), each with different participation privileges and responsibilities. The electronic commerce vendor 104A, B may also be a traditional marketing based vendor. Further, the vendor 104A, B may include one or both of electronic commerce and traditional brick and mortar store fronts. Alternatively, the vendor 104A, B may comprise only the fulfillment entity 110A, B and operate no storefront. In this case, the vendor 104A, B may rely on the order management system 108 to receive and process orders wherein the vendor 104A, B fulfills those orders as the fulfillment entity 110A, B.

The products or services offered by the vendor 104A, B include consumer products or services such as toothpaste, shampoo and other consumables as well as consumer electronics and other durable goods, etc. Services may include reminder services (described in more detail below), cleaning services, maintenance services or legal, accounting, secretarial or other professional services, or subscription based services such as magazines, book clubs, cellular service, voice mail service, etc. Further the offered products or services may also include office supplies, business inventory or office or business related services.

The fulfillment entity 110A, B is an entity, such as a warehouse and/or shipping agent, which provides the products or services to the end consumer. In the preferred embodiments, the fulfillment entity 110A, B is associated with the electronic commerce vendor 104A, B. In alternative embodiments, the fulfillment entity 110A, B is separate from the vendor 104A, B wherein the vendor 104A, B out-sources order fulfillment to one or more fulfillment entities 110A, B. The electronic commerce vendor 104A, B communicates with the fulfillment entity via the network 106 or via a private/internal communications channel. The fulfillment entity 110A, B fulfills orders for products or services by shipping or otherwise providing the products or services to the end consumer 102. Electronically distributable products or services, such as software, music or reminders may be fulfilled via the network 106.

In one embodiment, the recurring order management system 108, the vendor 104A, B and the fulfillment entity 110 are all comprised by the same entity 112. In alternative embodiments, one or more of the order management system 108, the vendor 104A, B or the fulfillment entity 110 are comprised by separate entities and further, order management system 108 can interact with multiple vendors 104A, B and multiple fulfillment entities 110A, B.

Figure 2:
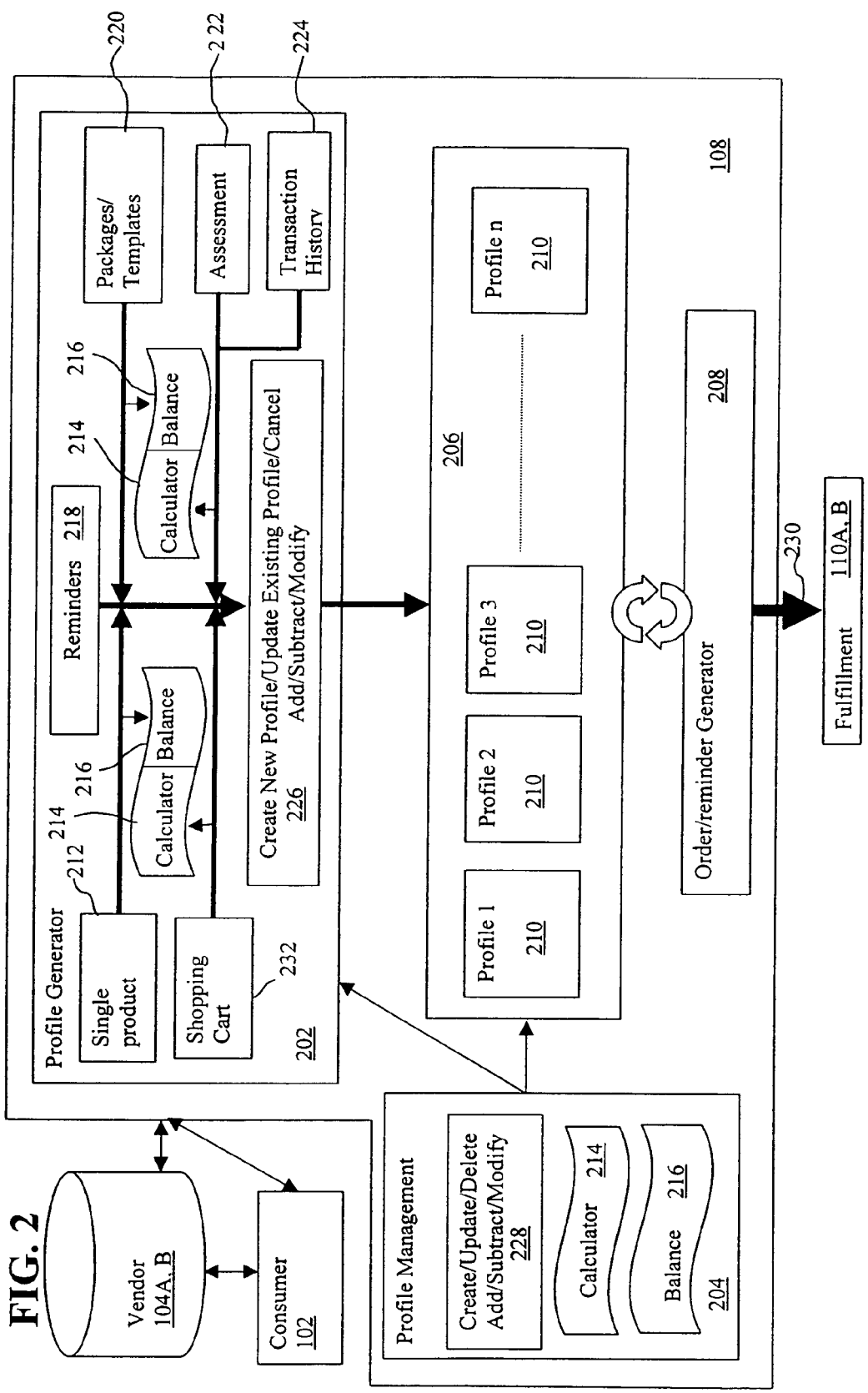
FIG. 2 depicts a more detailed block diagram of the recurring order management system of FIG. 1.

FIG. 2 shows a more detailed diagram of the order management system 108 of FIG. 1. In the preferred embodiment, the system 108 is coupled with the vendor 104A, B via hyper text transfer protocol ("HTTP") links displayed on a web site/web pages/screens associated with the vendor 104A, B. The web pages are associated with products or services provided by the vendor 104A, B and preferably provide a link to the order management system 108 so as to allow the particular product or service to be added to a standing order. In one embodiment, the link may be a Standing Order link provided on a particular product or service description page, an order entry page or a shopping cart/basket management page.

By choosing the Standing Order link, the consumer 102 is forwarded to an order management system interface 202, 204, preferably implemented as a web page, that allows the consumer 102 to create a new standing order profile or update an existing profile (described in more detail below). A standing order profile allows a consumer 102 to set up an automated order system that sends products and/or services to the user at regular intervals, which are selected by the user. Such standing orders provide an efficient method for establishing repetitive orders of products and/or services from the vendor 104A, B.

In one embodiment, all items in the user's shopping cart are placed in the new or existing profile utilizing the interface 204. The user then has the option of removing items from the profile. Consumers 102 are alerted in the shopping cart management page, preferably after checkout, when a particular item can be placed on standing order. Alternatively, the user selects items from the shopping cart to be included in the profile. Consumers 102 may place individual products or an entire order on a standing order quickly and easily. Users may also have multiple standing orders and the ability to add an item to a standing order on a one-time basis. As will be discussed below, consumers 102 may also interact with the order management system 108 directly to create and manage profiles.

The order management system 108 includes a profile generator 202, a profile management interface 204, a profile database 206 and an order generator 208. As will be discussed in more detail below, a standing/recurring order for a particular consumer 102 is stored in a profile 210. The profile 210 includes a list of products or services, preferably identified by an identifier such as a stock keeping unit ("SKU"), and a specification of how much and when, i.e. the recurrence, each of those products or services are to be delivered/provided. The profile 210 further includes payment and delivery information. The profile 210 preferably contains enough information to repeatedly fulfill the recurring order without further interaction from the consumer 102. Less information or additional information may be maintained as part of the profile.

The recurrence specifies when the order management system 108 is to generate the order to the fulfillment entity 110A, B and the frequency with which the order should be generated. In alternative embodiments, the recurrence specifies when the consumer 102 desires to receive the products or services and the frequency or delivery interval. For example, the profile 210 may specify that an order for two twelve ounce bottles of shampoo is to be generated on the $2^{nd}$ day of every other month. In this case, the order will be generated on the $2^{nd}$ day of the month and the recurrence interval is every two months, with the actual delivery taking place once the order has been processed by the fulfillment entity 110A, B. Alternate recurrence intervals include daily, weekly, monthly, yearly, etc. and may be defined by the consumer's 102 needs, such as defined by the predicted lifespan of the product. For example, if a consumer 102 orders a quantity of a specific product that lasts 38 days under normal usage, the recurrence interval for shipping additional quantities of that product may be every 38 days. Further, the order generation or scheduled delivery can be specified as a particular day of the week, e.g. deliver on Tuesdays, a particular day or week of the month, e.g. the third day or third week of the month or the first Tuesday of the month, a particular day or week of the year, etc. or any other specification which identifies a preferred order generation or order delivery day. In one embodiment, a profile 210 comprises a group of products or services to be delivered in each shipment according to the specified recurrence. Where a consumer 102 desires to receive products or services delivered in more than one shipment, additional profiles 210 may be created for the user. For example, where a consumer 102 desires to receive one bottle of shampoo each month on the second day of the month and one bottle of conditioner each month on the $18^{th}$ day of the month, two separate profiles 210, one for the shampoo and the other for the conditioner, are generated.

Figure 3A:
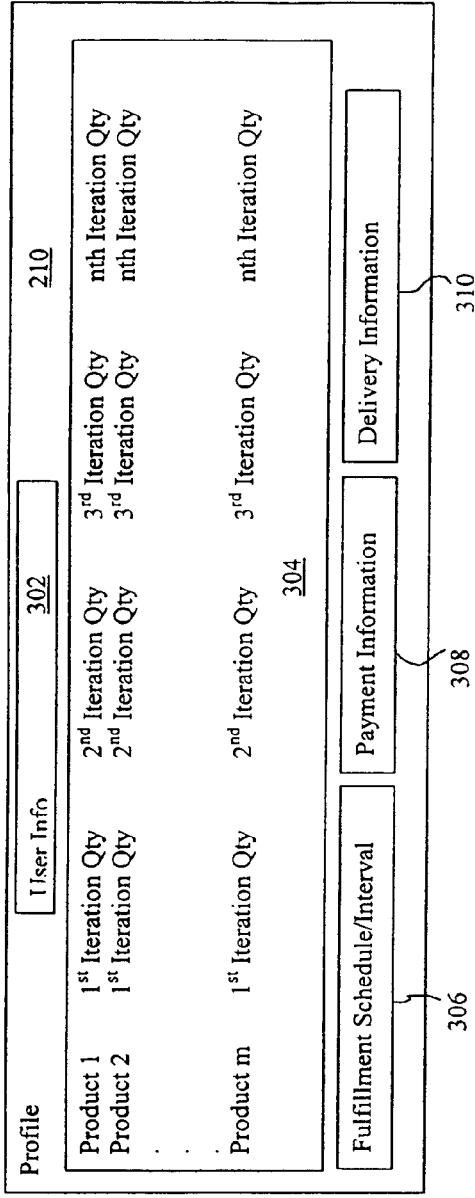
FIG. 3A depicts a block diagram of a first preferred profile for use with the recurring order management system of FIG. 2.

Referring to FIG. 3A, there is shown an exemplary profile 210. The profile 210 includes user information 302, such as name, address, account number, demographic information and preference information. Demographic information comprises objective descriptive classifications of consumers such as their age, sex, income, education, size of household, ownership of home, pet ownership, etc. The profile 210 further includes an order matrix 304, a fulfillment schedule/interval 306, payment information 308 and delivery information 310. The payment information 308 includes information about how the consumer 102 intends to pay for each recurring order and includes a billing address, credit or debit card/account information or other identifier of a fund source. In the preferred embodiments, the payment information 308 includes information which allows the order management system 108 to automatically collect payment for each recurring order at the time, or in advance of fulfillment.

The delivery information 310 includes information about where to ship the orders. This information may specify a different address than the billing address or even a different address from the address where the customer 102 resides. Where the recurring order is a gift, the delivery information 310 identifies the delivery address of the gift recipient and may include a gift message.

The order matrix 304 lists each product or service in the standing order. Each product or service is preferably identified by a SKU and a product description. Adjacent to each product or service is the quantity of that product or service that is to be delivered upon each iteration of the recurring order. Preferably, the quantities are specified as the number of units of the particular product, for example, two twelve ounce bottles of shampoo. Alternatively, the quantities can be specified in bulk, cases or lots in addition to units, eaches or singles. In the preferred embodiment, there are twelve iterations, one for each month of the year. Alternatively, 52 iterations, 1 for each week of the year, are provided as a default or the number of iterations may be customized by consumer 102. The order matrix 304 allows the consumer 102 to specify a different quantity for each iteration depending on their needs for the particular product or service.

The fulfillment schedule/interval 306 defines when each iteration of the recurring order should be delivered, such as on the $3^{rd}$ day of each particular month. The fulfillment schedule/interval 306 may further specify the number of iterations in the recurring order. Upon each iteration of the recurring order, an order for each of the products or services listed is generated in the specified quantities for that iteration and transmitted to the fulfillment entity 110A, B to be fulfilled.

In an alternate embodiment, a recurrence of individual products or groups of products are set up on different recurrence schedules within one profile 210. Further, the profile 210 specifies the quantities to be delivered on each recurrence. As will be discussed below, products or services are typically available in a particular unit quantity, such as a twelve ounce bottle, also known as "eaches" or "units" where bulk quantities are referred to as "cases" or "lots". Consumers 102 may specify standing orders which ships lesser quantities more frequently or larger quantities less frequently. Such specifications may depend on the product shelf life or the consumer's 102 ability to store the excess products. Further, such specifications may be tied to promotional offers by the vendor 104A, B of the particular products or services.

Figure 3B:
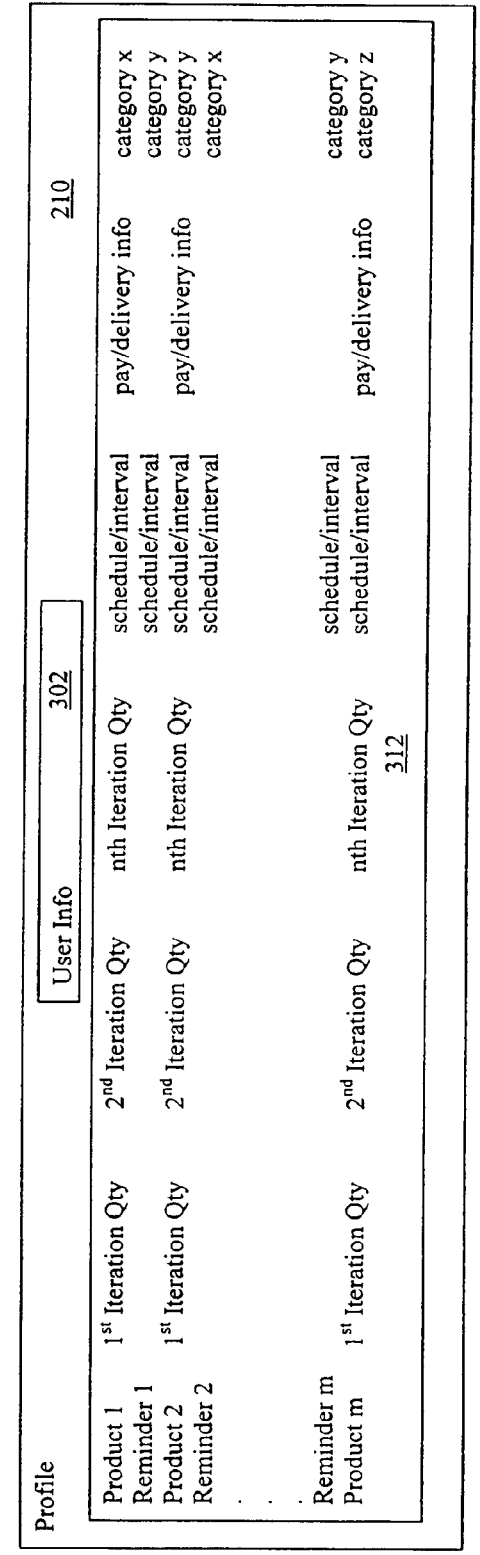
FIG. 3B depicts a block diagram of a second preferred profile for use with the recurring order management system of FIG. 2.

FIG. 3B shows a profile 210 which allows any product to be delivered at any time. Profile 210 of FIG. 3B is similar to profile 210 of FIG. 3A including user information 302 except that the order matrix 312 allows each product or service entry to specify a fulfillment schedule/interval for that product or service independent of the schedule/interval for other products or services. In an alternative embodiment, the consumer 102 may specify a delivery schedule for the particular product which defines when that product or service will be actually delivered, such as a periodic schedule or a variable schedule. Further, in another alternative embodiment, the consumer 102 may specify payment or delivery information for each product or service. For example, one particular product is charged to one account and delivered to one particular address while another product or service is charged to a second account and delivered to a different address.

In still another embodiment, the order matrix 312 may include a category field for each product or service allowing the consumer 102 to categorize and organize listed products or services to facilitate managing and maintaining the recurring order. Products or services may be categorized and grouped to allow group manipulation and modification. In another alternative embodiment, the profile 210 allows the specification of recurring reminders, which are discussed in more detail below. In still another embodiment, the profile 210 is calendar centric rather than product centric and is structured as a daily, monthly or yearly calendar allowing the consumer 102 to specify, by day or date, products and/or services and quantities to be delivered. In addition the consumer 102 specifies the recurrence, i.e. that the order for that particular product or service or group of products or services should recur on that day each month, or every other month or the order should recur every 30, 60 or 90 days thereafter, or that the order is one time only. For example, the consumer 102 may specify that on the first Tuesday of October, 2 twelve ounce bottles of shampoo are to be ordered and that this order should recur on the first Tuesday of every other month thereafter.

Again referring to FIG. 2, the profile generator 202 further includes a single product interface 212, a shopping cart interface 232, a reminder interface 218, a packages/templates interface 220, an assessment interface 222 and a transaction history interface 224. Each of these interfaces 212, 232, 218, 220, 222 and 224 is used to add products or services to an existing profile or create a new profile for these products or services. Preferably, each of these interfaces 212, 232, 218, 220, 222 and 224 create a temporary suggested profile 210 which the consumer 102 may modify, cancel or confirm/accept. Upon confirmation/acceptance, the suggested profile 210 is activated and stored in the profile database 206. It will be appreciated that the interfaces 212, 232, 218, 220, 222 and 224 can directly create an active profile which the consumer 102 then has the option to modify or cancel. Further, the profile generator 202 includes calculator 214 and balance 216 functions and a profile confirmation/modification interface 226. The profile generator 202 provides both an interface to the order management system 108 as well as the functionality to generate profiles 210. In the preferred embodiment, this interface comprises one or more web pages which present instructions to the consumer 102 and receive input from the consumer 102 using the hypertext transport protocol ("HTTP"), hypertext markup language ("HTML"), extensible markup language ("XML") or equivalent communications protocols and web page construction languages, or combination thereof, as are known in the art.

The single product interface 212 is used to add a particular product or service to an existing profile 210 or creates a new profile 210 for the product or service. The interface 212 can be accessed by the consumer 102 via the vendor 104A, B as described above or can be directly accessed by the consumer 102. For example, the vendor 104A, B can provide an HTTP link on a web page/file associated with a particular product or service to allow the consumer 102 to add that particular product or service to a standing order. The consumer 102 selects the link and is forwarded to the single product interface 212 of the order management system 108 where options are presented to specify the desired quantities and recurrence. Where the consumer 102 accesses the single product interface 212 directly, the interface 212 allows the consumer 102 to identify one or more desired products or services, such as by entering a product or service name or a SKU and, where necessary, a vendor 104A, B identifier. Alternatively, the single product interface 212 may provide HTTP links which provide the consumer 102 web pages associated with products or services provided by the vendors 104A, B. These web page may be provided by the vendor 104A, B or by the order management system 108.

The shopping cart interface 232 operates similarly to the single product ordering interface 212 and can be linked to from the shopping cart/basket web pages of the vendor 104A, B. A consumer 102 may add an entire shopping cart of products or services to a standing order profile 210 with one action. In an alternative embodiment, where the vendors 104A, B provide persistent shopping carts which maintain selected but unordered products or services beyond the consumer's 102 browsing session, the consumer 102 accesses the shopping cart interface 232 which is coupled with each persistent shopping cart that a consumer 102 has opened and allows the consumer 102 to add one or more products from one or more of those existing shopping carts to a standing order profile 210.

The packages/templates interface 220 allows the consumer 102 to pick from a set of predefined product groupings. Each product grouping includes one or more suggested products or services, a suggested recurrence for the grouping and suggested quantities to be delivered upon each recurrence. Suggested products or services are arranged and grouped based on a relationship among the products or services. For example, a product grouping may be provided, entitled "fitness freak" and comprise one or more suggested products or services related to health and fitness with suggested recurrences for each of the products or services tailored for a physically active consumer 102. Further, a grouping may be offered, entitled "family of 4" and comprise one or more suggested products or services that an average family of four might use along with a suggested recurrence pattern. Groupings may be offered based on any aspect of consumer 102 demographics or preferences or may be offered as a promotion coupled with free products or services, a discount price or other incentive opportunity. Where the vendor 104A, B comprises a multilevel marketing system and the consumer 102 is a direct sales representative or independent business owner within the marketing system, groupings may be provided which are tailored to helping the consumer 102 reach a particular sales or bonus goal.

Further, the selection of groupings offered to a particular consumer 102 may be tailored to the consumer's 102 demographics or preferences or where the vendor 104A, B comprises a membership club, the selection may be tailored to the consumer's 102 membership level. In one embodiment, the packages/templates interface 220 first determines the consumer's 102 demographics and preferences, such as through an interactive questionnaire or an interactive pick list or by referring to such information stored in a profile 210. Using the consumer's 102 responses, the packages/templates interface 220 generates/displays a selection of product or service groupings which match the consumer's demographics and/or preferences. In the preferred embodiments, groupings are referred as templates for new customers of the order management system 108 and are tailored to getting the new customer started with their recurring order. Further, groupings are referred to as packages for existing customers with existing profiles 210 and are tailored to assisting existing customers with updating their profiles 210.

Figure 6:
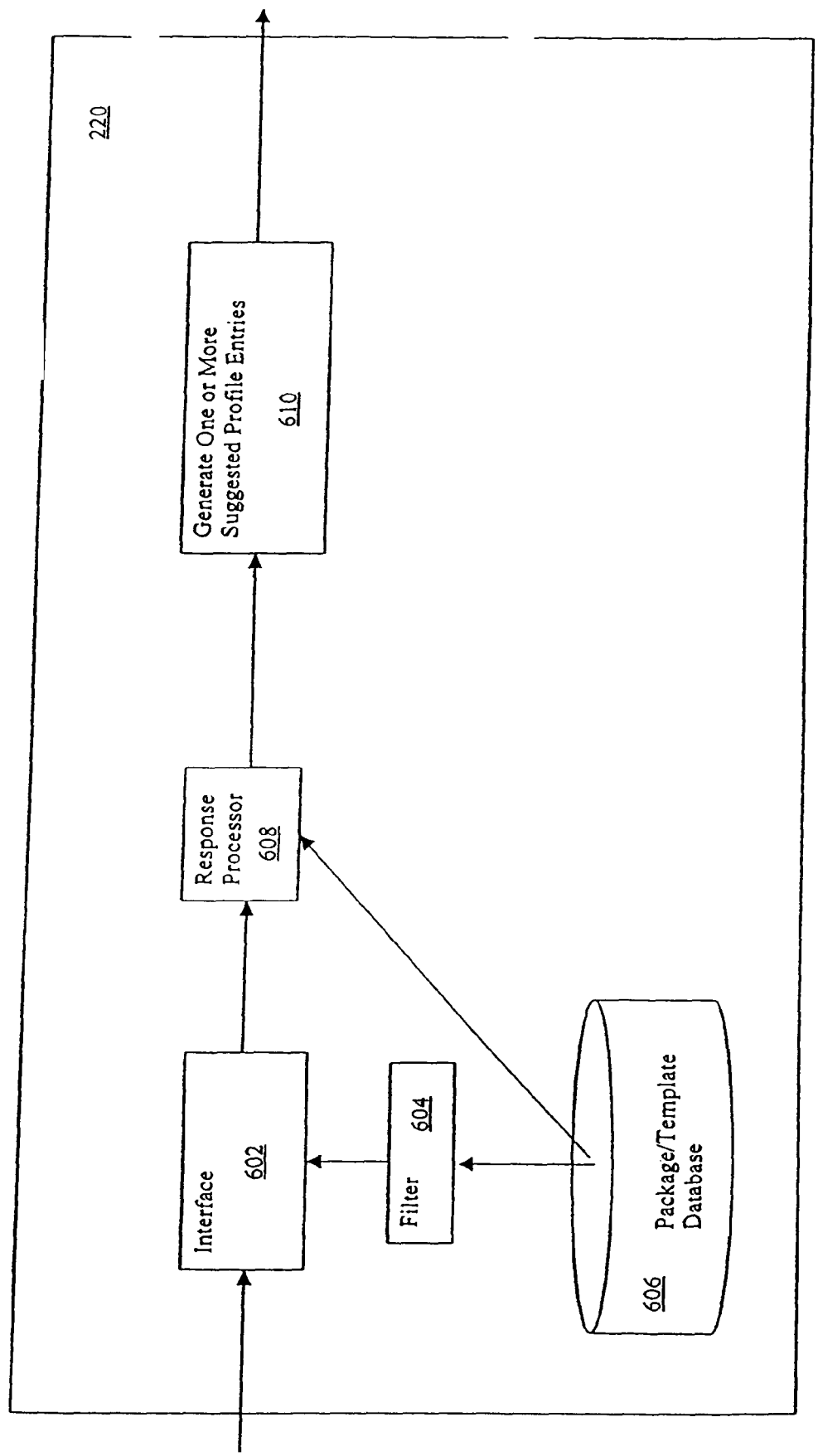
FIG. 6 depicts a block diagram of the packages/templates interface of FIG. 2.

FIG. 6 shows a block diagram of the packages/templates interface 220. The interface 220 comprises an interface web page 602 which presents the selection of suggested product or service groupings to the consumer 102. The available product and service groupings are stored in a database 606. The database 606 is coupled with the interface 602 via the filter 604 which is used to control which product or service groupings are made available to the consumer 102 as described above. The interface 606 is coupled with a response processor 608 which receives the selection from the consumer 102 of a product or service grouping. The response processor 608 retrieves the desired product or service grouping from the database 606 and forwards the grouping to the generator 610. Alternatively, the response processor 608 displays the contents of the particular selected grouping via the interface 602 to confirm the consumer's 102 selection. The generator 610 generates a suggested profile 210 comprising the one or more products or services from the groupings and the suggested recurrence pattern. The suggested profile 210 is then made available for balancing (described in more detail below) or sent to the profile confirmation/modification interface 226 (described in more detail below).

Referring to FIG. 2, the assessment interface 222 provides an interface to the order management system 108 for consumers 102 who are new to the order management system or who desire assistance in choosing products or services, proper quantities, or a proper recurrence. The assessment interface 222 provides one or more interactive messages to the consumer 102 in order to determine and suggest which products or services, quantities and what recurrence pattern would be appropriate for that consumer 102. The interactive messages may comprise option lists from which the consumer 102 chooses, questions which the consumer 102 answers or other information gathering methods. Information relating to one or more of consumer 102 demographics, subjective preferences and actual product usage may be gathered. Wherein the consumer 102 has an existing profile 210, one or more pieces of this information may be retrieved from the stored profile 210. For example, a consumer 102 may be asked if they do laundry themselves. If the answer is yes, they may be presented with an option list to select how many times they do laundry in a month. Further they may be asked if they are male or female, how old they are, yearly income and whether or not they use fabric softener.

The series of interactive messages may be part of a hierarchical or linear interrogatory or process flow which is used to determine which particular product or service should be suggested and what the suggested quantities and recurrence should be. In one embodiment, a first series of one or more interactive messages is related to determining whether a particular product is or would be used, while a second associated series of one or more interactive messages is used to determine the suggested recurrence and quantities per recurrence. In one embodiment, each response to the second series of interactive messages is associated with a multiplier which is used to compute the suggested recurrence and quantities. A first and second series of interactive messages are provided for different products or services. In an alternative embodiment, the assessment interface 222 presents a series of interactive messages designed to determine which name brand products the consumer 102 currently uses. The assessment interface 222 then determines a suggested profile 210 of suitable replacement products or services provided by the vendor 104A, B. Such a suggested profile 210 may be accompanied by a report of the cost savings over the name brand products.

Table 1.0, below, lists exemplary questions, expected responses and associated products for the preferred assessment interface 222.

TABLE 1.0

| CATEGORY DESCRIPTION | ASSESSMENT QUESTION | ASSOCIATED ANSWERS | RELATED PRODUCT(S) |
|---|---|---|---|
| Household Size | How many people live in the household full time? | Four+ | <Multiplier value> |
| Household Size | How many people live in the household full time? | Three | <Multiplier value> |
| Household Size | How many people live in the household full time? | Two | <Multiplier value> |
| Household Size | How many people live in the household full time? | One | <Multiplier value> |
| Household Size | How many people live in the household full time? | None | <Multiplier value> |
| Household Size | Number of females, 16 years or older | One | <Multiplier value> |
| Household Size | Number of females, 16 years or older | None | <Multiplier value> |
| Household Size | Number of females, 16 years or older | Four+ | <Multiplier value> |
| Household Size | Number of females, 16 years or older | Three | <Multiplier value> |
| Household Size | Number of females, 16 years or older | Two | <Multiplier value> |
| Household Size | Number of males, 16 years or older | Four+ | <Multiplier value> |
| Household Size | Number of males, 16 years or older | Three | <Multiplier value> |
| Household Size | Number of males, 16 years or older | Two | <Multiplier value> |
| Household Size | Number of males, 16 years or older | One | <Multiplier value> |
| Household Size | Number of males, 16 years or older | None | <Multiplier value> |
| Household Size | Number of boys between 4 years and 15 years? | Four+ | <Multiplier value> |
| Household Size | Number of boys between 4 years and 15 years? | Three | <Multiplier value> |
| Household Size | Number of boys between 4 years and 15 years? | None | <Multiplier value> |
| Household Size | Number of boys between 4 years and 15 years? | Two | <Multiplier value> |
| Household Size | Number of boys between 4 years and 15 years? | One | <Multiplier value> |
| Household Size | Number of girls between 4 years and 15 years? | None | <Multiplier value> |
| Household Size | Number of girls between 4 years and 15 years? | Four+ | <Multiplier value> |
| Household Size | Number of girls between 4 years and 15 years? | Three | <Multiplier value> |
| Household Size | Number of girls between 4 years and 15 years? | Two | <Multiplier value> |
| Household Size | Number of girls between 4 years and 15 years? | One | <Multiplier value> |
| Household Size | Number of children between 0 and three years? | Four+ | <Multiplier value> |
| Household Size | Number of children between 0 and three years? | Three | <Multiplier value> |
| Household Size | Number of children between 0 and three years? | Two | <Multiplier value> |
| Household Size | Number of children between 0 and three years? | One | <Multiplier value> |

TABLE 1.0-continued

| CATEGORY DESCRIPTION | ASSESSMENT QUESTION | ASSOCIATED ANSWERS | RELATED PRODUCT(S) |
|---|---|---|---|
| Household Size | Number of children between 0 and three years? | None | <Multiplier value> |
| Household Size | Number of pet cats in the household? | None | <Multiplier value> |
| Household Size | Number of pet cats in the household? | Two | <Multiplier value> |
| Household Size | Number of pet cats in the household? | One | <Multiplier value> |
| Household Size | Number of pet cats in the household? | Four+ | <Multiplier value> |
| Household Size | Number of pet cats in the household? | Three | <Multiplier value> |
| Household Size | Number of pet dogs in the household? | One | <Multiplier value> |
| Household Size | Number of pet dogs in the household? | None | <Multiplier value> |
| Household Size | Number of pet dogs in the household? | Four+ | <Multiplier value> |
| Household Size | Number of pet dogs in the household? | Three | <Multiplier value> |
| Household Size | Number of pet dogs in the household? | Two | <Multiplier value> |
| Household Size | Do you own a second home, cottage, or Rec Vehicle? | No | <Multiplier value> |
| Household Size | Do you own a second home, cottage, or Rec Vehicle? | Yes | <Multiplier value> |
| Household Size | Does anyone in your home smoke? | No | <no product> |
| Household Size | Does anyone in your home smoke? | Yes | Fabric Freshner ™ |
| Household Size | Does anyone in your home wear glasses? | No | <no product> |
| Household Size | Does anyone in your home wear glasses? | Yes | SeeSpray ™ Lens Cleaner |
| Household Size | Does anyone in your home wear contact lenses? | No | <no product> |
| Household Size | Does anyone in your home wear contact lenses? | Yes | Saline solution, multi-purpose solution |
| Household Size | How many turtles are in your house? | None | <no product> |
| Household Size | How many turtles are in your house? | Four+ | <Multiplier value>, turtle food |
| Household Size | How many turtles are in your house? | Three | <Multiplier value>, turtle food |
| Household Size | How many turtles are in your house? | Two | <Multiplier value>, turtle food |
| Household Size | How many turtles are in your house? | One | <Multiplier value>, turtle food |
| Residence Type/Layout | Number of bathrooms? | Four+ | Pursue ™ Toilet Bowl Cleaner, Pursue ™ Disinfectant cleaner |
| Residence Type/Layout | Number of bathrooms? | Three | Pursue ™ Toilet Bowl Cleaner, Pursue ™ Disinfectant cleaner |
| Residence Type/Layout | Number of bathrooms? | Two | Pursue ™ Toilet Bowl Cleaner, Pursue ™ Disinfectant cleaner |
| Residence Type/Layout | Number of bathrooms? | One | Pursue ™ Toilet Bowl Cleaner, Pursue ™ Disinfectant cleaner |
| Residence Type/Layout | Number of bathrooms? | None | <no product> |
| Residence Type/Layout | Approximately how many square feet is your house? | 3500-4500 sq ft | <Multiplier value> |
| Residence Type/Layout | Approximately how many square feet is your house? | 2500-3500 sq ft | <Multiplier value> |
| Residence Type/Layout | Approximately how many square feet is your house? | 1500-2500 sq ft | <Multiplier value> |

TABLE 1.0-continued

| CATEGORY DESCRIPTION | ASSESSMENT QUESTION | ASSOCIATED ANSWERS | RELATED PRODUCT(S) |
|---|---|---|---|
| Residence Type/Layout | Approximately how many square feet is your house? | Less than 1500 sq ft | <Multiplier value> |
| Residence Type/Layout | What % of your floors are covered in Hardwood? | >75% | <Multiplier value>, Durashine ™ Floor Polish |
| Residence Type/Layout | What % of your floors are covered in Hardwood? | 50-75% | <Multiplier value>, Durashine ™ Floor Polish |
| Residence Type/Layout | What % of your floors are covered in Hardwood? | 25-50% | <Multiplier value>, Durashine ™ Floor Polish |
| Residence Type/Layout | What % of your floors are covered in Hardwood? | Less than 25% | <Multiplier value>, Durashine ™ Floor Polish |
| Residence Type/Layout | What % of your floors are covered in Hardwood? | None | <no product> |
| Residence Type/Layout | What % of your floors are covered in Linoleum? | None | <no product |
| Residence Type/Layout | What % of your floors are covered in Linoleum? | >75% | <Multiplier value>, Durashine ™ Floor Polish |
| Residence Type/Layout | What % of your floors are covered in Linoleum? | 50-75% | <Multiplier value>, Durashine ™ Floor Polish |
| Residence Type/Layout | What % of your floors are covered in Linoleum? | 25-50% | <Multiplier value>, Durashine ™ Floor Polish |
| Residence Type/Layout | What % of your floors are covered in Linoleum? | Less than 25% | <Multiplier value>, Durashine ™ Floor Polish |
| Residence Type/Layout | What % of your floors are covered in Tile? | 50-75% | <Multiplier value>, Durashine ™ Floor Polish |
| Residence Type/Layout | What % of your floors are covered in Tile? | 25-50% | <Multiplier value>, Durashine ™ Floor Polish |
| Residence Type/Layout | What % of your floors are covered in Tile? | Less than 25% | <Multiplier value>, Durashine ™ Floor Polish |
| Residence Type/Layout | What % of your floors are covered in Tile? | None | <no product> |
| Residence Type/Layout | What % of your floors are covered in Tile? | >75% | <Multiplier value>, Durashine ™ Floor Polish |
| Residence Type/Layout | What % of your floors are covered in Carpet? | None | <no product> |
| Residence Type/Layout | What % of your floors are covered in Carpet? | 25-50% | <Multiplier value>, Carpet Shampoo, Magic Foam ™ Carpet Cleaner |
| Residence Type/Layout | What % of your floors are covered in Carpet? | Less than 25% | <Multiplier value>, Carpet Shampoo, Magic Foam ™ Carpet Cleaner |
| Residence Type/Layout | What % of your floors are covered in Carpet? | >75% | <Multiplier value>, Carpet Shampoo, Magic Foam ™ Carpet Cleaner |
| Residence Type/Layout | What % of your floors are covered in Carpet? | 50-75% | <multiplier>, Carpet Shampoo, Magic Foam ™ Carpet Cleaner |
| Residence Type/Layout | What is the approximate age of your home? | 10-25 years | <Multiplier value> |
| Residence Type/Layout | What is the approximate age of your home? | 0-10 years | <Multiplier value> |
| Residence Type/Layout | What is the approximate age of your home? | Over 50 years | <Multiplier value> |
| Residence Type/Layout | What is the approximate age of your home? | 25-50 years | <Multiplier value> |

TABLE 1.0-continued

| CATEGORY DESCRIPTION | ASSESSMENT QUESTION | ASSOCIATED ANSWERS | RELATED PRODUCT(S) |
|---|---|---|---|
| Residence Type/Layout | How many cars do you drive? | Two+ | <Multiplier value> |
| Residence Type/Layout | How many cars do you drive? | One | <Multiplier value> |
| General Cleaning | Do you use counter top cleaner? | Yes | Pursue ™ Disinfectant cleaner, SeeSpray ™, Chrome & Glass cleaner |
| General Cleaning | Do you use counter top cleaner? | No | <no product> |
| General Cleaning | Does your home have an automatic dishwasher? | Yes | Crystal Bright ™ automatic dishwashing formula (hard or soft formula) |
| General Cleaning | Does your home have an automatic dishwasher? | No | <no product> |
| General Cleaning | Does your home have soft water? | No | <apply to dishwasher question> |
| General Cleaning | Does your home have soft water? | Yes | <apply to dishwasher question> |
| General Cleaning | Do you use a cleaning service? | Yes | <no product> |
| General Cleaning | Do you use a cleaning service? | No | Floor polish, dusting spray, bathroom cleaner |
| Laundry | Do you use liquid laundry Detergent? | Yes | SA8 ™ Detergent-Liquid |
| Laundry | Do you use liquid laundry Detergent? | No | <no product> |
| Laundry | Do you use powdered laundry detergent? | Yes | SA8 ™ Detergent-Powder |
| Laundry | Do you use powdered laundry detergent? | No | <no product> |
| Laundry | Do you use a liquid stain remover? | Yes | Pre-Wash spot treatment |
| Laundry | Do you use a liquid stain remover? | No | <no product> |
| Laundry | Do you use an all fabric type bleach? | Yes | SA8 ™ all-fabric bleach |
| Laundry | Do you use an all fabric type bleach? | No | <no product> |
| Laundry | Do you use an aerosol stain remover? | Yes | Pre-Wash spot treatment |
| Laundry | Do you use an aerosol stain remover? | No | <no product> |
| Laundry | Do you use a chlorine bleach? | Yes | SA8 ™ Dry Chlorine bleach |
| Laundry | Do you use a chlorine bleach? | No | <no product> |
| Laundry | Do you ever use a Laundromat? | Often | <Multiplier value>, SA8 ™ Samples |
| Laundry | Do you ever use a Laundromat? | Occasionally | <Multiplier value>, SA8 ™ Samples |
| Laundry | Do you ever use a Laundromat? | Rarely | <Multiplier value>, SA8 ™ Samples |
| Laundry | Do you ever use a Laundromat? | Never | <no product> |
| Personal Care | How many family members use shaving cream? | Four+ | <Multiplier value>, Grooming Gear ™ shave cream |
| Personal Care | How many family members use shaving cream? | Three | <Multiplier value>, Grooming Gear ™ shave cream |
| Personal Care | How many family members use shaving cream? | Two | <Multiplier value>, Grooming Gear ™ shave cream |
| Personal Care | How many family members use shaving cream? | One | <Multiplier value>, Grooming Gear ™ shave cream |
| Personal Care | How many family members use shaving cream? | None | <no product> |
| Personal Care | How many family members have oily skin? | One | <Multiplier value>, Artistry ™ |

TABLE 1.0-continued

| CATEGORY DESCRIPTION | ASSESSMENT QUESTION | ASSOCIATED ANSWERS | RELATED PRODUCT(S) |
| --- | --- | --- | --- |
| Personal Care | How many family members have oily skin? | None | <no product> |
| Personal Care | How many family members have oily skin? | Four+ | <Multiplier value>, Artistry ™ |
| Personal Care | How many family members have oily skin? | Three | <Multiplier value>, Artistry ™ |
| Personal Care | How many family members have oily skin? | Two | <Multiplier value>, Artistry ™ |
| Personal Care | How many family members have dry skin? | None | <no product> |
| Personal Care | How many family members have dry skin? | Four+ | <Multiplier value>, Artistry ™ |
| Personal Care | How many family members have dry skin? | Three | <Multiplier value>, Artistry ™ |
| Personal Care | How many family members have dry skin? | Two | <Multiplier value>, Artistry ™ |
| Personal Care | How many family members have dry skin? | One | <Multiplier value>, Artistry ™ |
| Personal Care | How many family members have sensitive skin? | Three | <Multiplier value>, Artistry ™ |
| Personal Care | How many family members have sensitive skin? | Two | <Multiplier value>, Artistry ™ |
| Personal Care | How many family members have sensitive skin? | One | <Multiplier value>, Artistry ™ |
| Personal Care | How many family members have sensitive skin? | None | <no product> |
| Personal Care | How many family members have sensitive skin? | Four+ | <Multiplier value>, Artistry ™ |
| Personal Care | How many family members wear makeup? | None | <no product> |
| Personal Care | How many family members wear makeup? | Two | <Multiplier value>, Artistry ™ |
| Personal Care | How many family members wear makeup? | One | <Multiplier value>, Artistry ™ |
| Personal Care | How many family members wear makeup? | Four+ | <Multiplier value>, Artistry ™ |
| Personal Care | How many family members wear makeup? | Three | <Multiplier value>, Artistry ™ |
| Personal Care | How many use an alpha hydroxy product? | One | <Multiplier value>, Artistry ™ |
| Personal Care | How many use an alpha hydroxy product? | None | <no product> |
| Personal Care | How many use an alpha hydroxy product? | Four+ | <Multiplier value>, Artistry ™ |
| Personal Care | How many use an alpha hydroxy product? | Three | <Multiplier value>, Artistry ™ |
| Personal Care | How many use an alpha hydroxy product? | Two | <Multiplier value>, Artistry ™ |
| Personal Care | How many family members use mouthwash? | None | <no product> |
| Personal Care | How many family members use mouthwash? | Four+ | <Multiplier value>, Glister ™ Oral Rinse, Sweet Shot ™ |
| Personal Care | How many family members use mouthwash? | Three | <Multiplier value>, Glister ™ Oral Rinse, Sweet Shot ™ |
| Personal Care | How many family members use mouthwash? | Two | <Multiplier value>, Glister ™ Oral Rinse, Sweet Shot ™ |
| Personal Care | How many family members use mouthwash? | One | <Multiplier value>, Glister ™ Oral Rinse, Sweet Shot ™ |
| Personal Care | How many family members use dental floss? | Four+ | <Multiplier value> |

TABLE 1.0-continued

| CATEGORY DESCRIPTION | ASSESSMENT QUESTION | ASSOCIATED ANSWERS | RELATED PRODUCT(S) |
| --- | --- | --- | --- |
| Personal Care | How many family members use dental floss? | Three | <Multiplier value> |
| Personal Care | How many family members use dental floss? | Two | <Multiplier value> |
| Personal Care | How many family members use dental floss? | One | <Multiplier value> |
| Personal Care | How many family members use dental floss? | None | <no product> |
| Personal Care | How many family members use stick deodorant? | None | <no product> |
| Personal Care | How many family members use stick deodorant? | Two | <Multiplier value>, Deter ™ Deodorant |
| Personal Care | How many family members use stick deodorant? | One | <Multiplier value>, Deter ™ Deodorant |
| Personal Care | How many family members use stick deodorant? | Four+ | <Multiplier value>, Deter ™ Deodorant |
| Personal Care | How many family members use stick deodorant? | Three | <Multiplier value>, Deter ™ Deodorant |
| Personal Care | How many family members use spray deodorant? | One | <Multiplier value>, Deter ™ Deodorant |
| Personal Care | How many family members use spray deodorant? | None | <no product> |
| Personal Care | How many family members use spray deodorant? | Four+ | <Multiplier value>, Deter ™ Deodorant |
| Personal Care | How many family members use spray deodorant? | Three | <Multiplier value>, Deter ™ Deodorant |
| Personal Care | How many family members use spray deodorant? | Two | <Multiplier value>, Deter ™ Deodorant |
| Personal Care | How many family members use roll-on deodorant? | None | <no product> |
| Personal Care | How many family members use roll-on deodorant? | Four+ | <Multiplier value>, Deter ™ Deodorant |
| Personal Care | How many family members use roll-on deodorant? | Three | <Multiplier value>, Deter ™ Deodorant |
| Personal Care | How many family members use roll-on deodorant? | Two | <Multiplier value>, Deter ™ Deodorant |
| Personal Care | How many family members use roll-on deodorant? | One | <Multiplier value>, Deter ™ Deodorant |
| Personal Care | How many family members use pump type hair spray? | Three | <Multiplier value> |
| Personal Care | How many family members use pump type hair spray? | Two | <Multiplier value> |
| Personal Care | How many family members use pump type hair spray? | One | <Multiplier value> |
| Personal Care | How many family members use pump type hair spray? | None | <Multiplier value> |
| Personal Care | How many family members use pump type hair spray? | Four+ | <Multiplier value> |
| Personal Care | How many family members use aerosol hair spray? | None | <no product> |

TABLE 1.0-continued

| CATEGORY DESCRIPTION | ASSESSMENT QUESTION | ASSOCIATED ANSWERS | RELATED PRODUCT(S) |
|---|---|---|---|
| Personal Care | How many family members use aerosol hair spray? | Two | <Multiplier value> |
| Personal Care | How many family members use aerosol hair spray? | One | <Multiplier value> |
| Personal Care | How many family members use aerosol hair spray? | Four+ | <Multiplier value> |
| Personal Care | How many family members use aerosol hair spray? | Three | <Multiplier value> |
| Personal Care | How many family members use hair styling gel? | One | <Multiplier value> |
| Personal Care | How many family members use hair styling gel? | None | <no product> |
| Personal Care | How many family members use hair styling gel? | Four+ | <Multiplier value> |
| Personal Care | How many family members use hair styling gel? | Three | <Multiplier value> |
| Personal Care | How many family members use hair styling gel? | Two | <Multiplier value> |
| Personal Care | How many family members use hair styling mousse? | None | <no product> |
| Personal Care | How many family members use hair styling mousse? | Four+ | <Multiplier value> |
| Personal Care | How many family members use hair styling mousse? | Three | <Multiplier value> |
| Personal Care | How many family members use hair styling mousse? | Two | <Multiplier value> |
| Personal Care | How many family members use hair styling mousse? | One | <Multiplier value> |
| Personal Care | How many family members use hair conditioner? | Four+ | <Multiplier value>, Satinique ™ |
| Personal Care | How many family members use hair conditioner? | Three | <Multiplier value>, Satinique ™ |
| Personal Care | How many family members use hair conditioner? | Two | <Multiplier value>, Satinique ™ |
| Personal Care | How many family members use hair conditioner? | One | <Multiplier value>, Satinique ™ |
| Personal Care | How many family members use hair conditioner? | None | <no product> |
| Personal Care | How many use hair shampoo/conditioner combination? | None | <no product> |
| Personal Care | How many use hair shampoo/conditioner combination? | Two | <Multiplier value>, Satinique ™ |
| Personal Care | How many use hair shampoo/conditioner combination? | One | <Multiplier value>, Satinique ™ |
| Personal Care | How many use hair shampoo/conditioner combination? | Four+ | <Multiplier value>, Satinique ™ |
| Personal Care | How many use hair shampoo/conditioner combination? | Three | <Multiplier value>, Satinique ™ |
| Personal Care | How many members use a dandruff control product? | One | <Multiplier value>, Satinique ™ |

TABLE 1.0-continued

| CATEGORY DESCRIPTION | ASSESSMENT QUESTION | ASSOCIATED ANSWERS | RELATED PRODUCT(S) |
|---|---|---|---|
| Personal Care | How many members use a dandruff control product? | None | <no product> |
| Personal Care | How many members use a dandruff control product? | Four+ | <Multiplier value>, Satinique ™ |
| Personal Care | How many members use a dandruff control product? | Three | <Multiplier value>, Satinique ™ |
| Personal Care | How many members use a dandruff control product? | Two | <Multiplier value>, Satinique ™ |
| Health & Nutrition | How many family members use a multi vitamin? | One | <Multiplier value>, Double X ™ |
| Health & Nutrition | How many family members use a multi vitamin? | None | <no product> |
| Health & Nutrition | How many family members use a multi vitamin? | Four+ | <Multiplier value>, Double X ™ |
| Health & Nutrition | How many family members use a multi vitamin? | Three | <Multiplier value>, Double X ™ |
| Health & Nutrition | How many family members use a multi vitamin? | Two | <Multiplier value>, Double X ™ |
| Health & Nutrition | How many family members use energy products? | Four+ | <Multiplier value>, Nutrilite ™ |
| Health & Nutrition | How many family members use energy products? | Three | <Multiplier value>, Nutrilite ™ |
| Health & Nutrition | How many family members use energy products? | Two | <Multiplier value>, Nutrilite ™ |
| Health & Nutrition | How many family members use energy products? | One | <Multiplier value>, Nutrilite ™ |
| Health & Nutrition | How many family members use energy products? | None | <no product> |
| Health & Nutrition | How many family members use Herbal products? | Four+ | <Multiplier value>, Nutrilite ™ |
| Health & Nutrition | How many family members use Herbal products? | Three | <Multiplier value>, Nutrilite ™ |
| Health & Nutrition | How many family members use Herbal products? | Two | <Multiplier value>, Nutrilite ™ |
| Health & Nutrition | How many family members use Herbal products? | One | <Multiplier value>, Nutrilite ™ |
| Health & Nutrition | How many family members use Herbal products? | None | <no product> |
| Health & Nutrition | How many family members take Vitamin A? | Two | <Multiplier value>, Nutrilite A ™ |
| Health & Nutrition | How many family members take Vitamin A? | One | <Multiplier value>, Nutrilite A ™ |
| Health & Nutrition | How many family members take Vitamin A? | None | <no product> |
| Health & Nutrition | How many family members take Vitamin C? | Four+ | <Multiplier value>, Nutrilite C ™ |
| Health & Nutrition | How many family members take Vitamin C? | Three | <Multiplier value>, Nutrilite C ™ |
| Health & Nutrition | How many family members take Vitamin C? | Two | <Multiplier value>, Nutrilite C ™ |

TABLE 1.0-continued

| CATEGORY DESCRIPTION | ASSESSMENT QUESTION | ASSOCIATED ANSWERS | RELATED PRODUCT(S) |
|---|---|---|---|
| Health & Nutrition | How many family members take Vitamin C? | One | <Multiplier value>, Nutrilite C ™ |
| Health & Nutrition | How many family members take Vitamin C? | None | <no product> |
| Health & Nutrition | How many family members take Vitamin A? | Four+ | <Multiplier value>, Nutrilite A ™ |
| Health & Nutrition | How many family members take Vitamin A? | Three | <Multiplier value>, Nutrilite A ™ |
| Health & Nutrition | How many family members take Calcium? | None | <no product> |
| Health & Nutrition | How many family members take Calcium? | Four+ | <Multiplier value>, Nutrilite ™ |
| Health & Nutrition | How many family members take Calcium? | Three | <Multiplier value>, Nutrilite ™ |
| Health & Nutrition | How many family members take Calcium? | Two | <Multiplier value>, Nutrilite ™ |
| Health & Nutrition | How many family members take Calcium? | One | <Multiplier value>, Nutrilite ™ |
| Health & Nutrition | How many family members take Vitamin B? | None | <no product> |
| Health & Nutrition | How many family members take Vitamin B? | Four+ | <Multiplier value>, Nutrilite ™ |
| Health & Nutrition | How many family members take Vitamin B? | Three | <Multiplier value>, Nutrilite ™ |
| Health & Nutrition | How many family members take Vitamin B? | Two | <Multiplier value>, Nutrilite ™ |
| Health & Nutrition | How many family members take Vitamin B? | One | <Multiplier value>, Nutrilite ™ |
| Health & Nutrition | How many family members take Vitamin E? | Four+ | <Multiplier value>, Nutrilite ™ |
| Health & Nutrition | How many family members take Vitamin E? | Three | <Multiplier value>, Nutrilite ™ |
| Health & Nutrition | How many family members take Vitamin E? | Two | <Multiplier value>, Nutrilite ™ |
| Health & Nutrition | How many family members take Vitamin E? | One | <Multiplier value>, Nutrilite ™ |
| Health & Nutrition | How many family members take Vitamin E? | None | <no product> |
| Health & Nutrition | How many family members take Children's Vitamins? | Three | <Multiplier value>, Nutrilite Chewables ™ |
| Health & Nutrition | How many family members take Children's Vitamins? | Two | <Multiplier value>, Nutrilite Chewables ™ |
| Health & Nutrition | How many family members take Children's Vitamins? | One | <Multiplier value>, Nutrilite Chewables ™ |
| Health & Nutrition | How many family members take Children's Vitamins? | None | <no product> |
| Health & Nutrition | How many family members take Children's Vitamins? | Four | <Multiplier value>, Nutrilite Chewables ™ |
| Health & Nutrition | How many family members use Memory products? | Four+ | <Multiplier value>, Nutrilite ™ |
| Health & Nutrition | How many family members use Memory products? | Three | <Multiplier value>, Nutrilite ™ |
| Health & Nutrition | How many family members use Memory products? | Two | <Multiplier value>, Nutrilite ™ |

TABLE 1.0-continued

| CATEGORY DESCRIPTION | ASSESSMENT QUESTION | ASSOCIATED ANSWERS | RELATED PRODUCT(S) |
|---|---|---|---|
| Health & Nutrition | How many family members use Memory products? | One | <Multiplier value>, Nutrilite ™ |
| Health & Nutrition | How many family members use Memory products? | None | <no product> |
| Health & Nutrition | How many members use Weight Control products? | One | <Multiplier value>, Nutrilite ™ |
| Health & Nutrition | How many members use Weight Control products? | None | <no product> |
| Health & Nutrition | How many members use Weight Control products? | Four+ | <Multiplier value>, Nutrilite ™ |
| Health & Nutrition | How many members use Weight Control products? | Three | <Multiplier value>, Nutrilite ™ |
| Health & Nutrition | How many members use Weight Control products? | Two | <Multiplier value>, Nutrilite ™ |
| Health & Nutrition | How many family members use Sports products? | None | <no product> |
| Health & Nutrition | How many family members use Sports products? | Four+ | <Multiplier value>, Nutrilite ™ |
| Health & Nutrition | How many family members use Sports products? | Three | <Multiplier value>, Nutrilite ™ |
| Health & Nutrition | How many family members use Sports products? | Two | <Multiplier value>, Nutrilite ™ |
| Health & Nutrition | How many family members use Sports products? | One | <Multiplier value>, Nutrilite ™ |
| Health & Nutrition | How many family members use Prostate products? | Four+ | <Multiplier value>, Nutrilite ™ |
| Health & Nutrition | How many family members use Prostate products? | Three | <Multiplier value>, Nutrilite ™ |
| Health & Nutrition | How many family members use Prostate products? | Two | <Multiplier value>, Nutrilite ™ |
| Health & Nutrition | How many family members use Prostate products? | One | <Multiplier value>, Nutrilite ™ |
| Health & Nutrition | How many family members use Prostate products? | None | <no product> |
| Misc—Drinks | Do you prefer "premium" blend coffee each day? | Yes | Nine To Five ™ Coffee |
| Misc—Drinks | Do you prefer "premium" blend coffee each day? | No | <no product> |
| Misc—Drinks | How many cups of regular coffee do you make daily? | One | <Multiplier value>, Nine To Five ™ Coffee |
| Misc—Drinks | How many cups of regular coffee do you make daily? | None | <no product> |
| Misc—Drinks | How many cups of regular coffee do you make daily? | Four+ | <Multiplier value>, Nine To Five ™ Coffee |
| Misc—Drinks | How many cups of regular coffee do you make daily? | Three | <Multiplier value>, Nine To Five ™ Coffee |
| Misc—Drinks | How many cups of regular coffee do you make daily? | Two | <Multiplier value>, Nine To Five ™ Coffee |
| Misc—Drinks | How many cups of decaf coffee do you make daily? | None | <no product> |

TABLE 1.0-continued

| CATEGORY DESCRIPTION | ASSESSMENT QUESTION | ASSOCIATED ANSWERS | RELATED PRODUCT(S) |
|---|---|---|---|
| Misc—Drinks | How many cups of decaf coffee do you make daily? | Four+ | <Multiplier value>, Nine To Five ™ Coffee |
| Misc—Drinks | How many cups of decaf coffee do you make daily? | Three | <Multiplier value>, Nine To Five ™ Coffee |
| Misc—Drinks | How many cups of decaf coffee do you make daily? | Two | <Multiplier value>, Nine To Five ™ Coffee |
| Misc—Drinks | How many cups of decaf coffee do you make daily? | One | <Multiplier value>, Nine To Five ™ Coffee |
| Misc—Drinks | How many cups of tea do you make daily? | Four+ | <Multiplier value>, Nine To Five ™ Tea |
| Misc—Drinks | How many cups of tea do you make daily? | Three | <Multiplier value>, Nine To Five ™ Tea |
| Misc—Drinks | How many cups of tea do you make daily? | Two | <Multiplier value>, Nine To Five ™ Tea |
| Misc—Drinks | How many cups of tea do you make daily? | One | <Multiplier value>, Nine To Five ™ Tea |
| Misc—Drinks | How many cups of tea do you make daily? | None | <no product> |
| Cars | How many cars do you own? | None | <no product> |
| Cars | How many cars do you own? | Two | <Multiplier value> |
| Cars | How many cars do you own? | One | <Multiplier value> |
| Cars | How many cars do you own? | Four+ | <Multiplier value> |
| Cars | How many cars do you own? | Three | <Multiplier value> |
| Cars | Do you wash your own car? | Yes | Mint Condition ™ Car Wash, Gel & Tar Remover, Trim & Tire Protectant |
| Cars | Do you wash your own car? | No | <no product> |
| Cars | Do you wax your own car? | Yes | Mint Condition ™ Car Wash, Gel & Tar Remover, Trim & Tire Protectant |
| Cars | Do you wax your own car? | No | <no product> |
| Cars | Do you change your car's oil yourself? | Yes | Freedom ™ Synthetic Oil |
| Cars | Do you change your car's oil yourself? | No | <no product> |
| Cars | Do you use a fuel additive? | Yes | Freedom ™ Fuel Additive |
| Cars | Do you use a fuel additive? | No | <no product> |

In one embodiment, the interactive messages consist of a linear set of interrogatives such as those shown in Table 1.0 above. The assessment interface 222 provides a structural framework within which marketers of the vendor 104A, B or order management system 108 may specify the interrogatives, expected responses and associated products or operations to be performed. The framework permits the marketer to define one or more categories of interrogatives. Within each category, the marketer specifies one or more interrogative messages and the expected responses. In actual use, the interrogative is presented along with a pick-list which displays the acceptable choices. The consumer 102 picks the appropriate response from the list. In addition, for each response, the marketer can define an associated product or group of products and/or an operation or rule to be performed on the consumer's 102 response. The rule may consist of a mathematical calculation using the consumer's response and stored data regarding the associated product. Further, the calculation may take into account the responses from other interrogatives. In one embodiment, each rule associated with each product or products is further associated with a predicted/assumed recommended annual usage rate for that product for one average person as determined by the marketing department. For example, a "yes" response to "do you use a powdered laundry detergent?" would be associated with SA8™ laundry detergent and further associated with the response to the interrogative for "How many adults are in your household?". The associated rule then would compute the average recommended annual usage for one person of SA8 times the number of people in the household. Where the number of children are factored in, a ½ multiplier may be included to account for the lower usage rate of a child versus the predicted average person. In this way, the numeric responses are multiplied against the average annual usage to determine the total product quantity to deliver in a year. One or more interrogatives may also be formatted to make a more accurate determination of actual usage rates rather then rely on the predicted usage rates. For example, rather then simply asking the consumer whether or not they do laundry and using a predicted average annual usage rate, the interrogatives may ask how often the consumer 102 does laundry and how many load are done each time. Using this information, the total number of loads can be computed and divided into the known number of loads in 1 unit of SA8 laundry detergent to arrive at the recommended quantity.

In operation, the assessment interface 222 presents a list of interrogatives to the consumer 102 via a web page. The consumer 102 uses the pick-lists corresponding to each interrogative to set their responses. The consumer 102 then selects a "submit" button which sends the interrogatives, responses and associated rules to a host mainframe which computes the results of all of the rules. The rules determine the recommended annual quantities that the consumer 102 must purchase, computed as the suggested annual number of unit quantities of the product that should be purchased. Fractional unit quantities are appropriately rounded. In an alternative embodiment, the unit quantity determination factors in the availability of different unit sizes, such as a 12 oz and 24 oz size. Logic then determines which quantity size is appropriate for each unit given the usage rate and the computed annual unit quantities. Such determinations may further be based on the availability of discounts, for example, for bulk purchases.

Once the number of unit quantities for the year are determined, calendaring and scheduling logic is applied to determine how to spread the delivery those unit quantities over the year. Table 2.0 shows the logic utilized to spread the delivery schedule. This table is defined by the marketing department of the vendor 104A, B and may be adjusted accordingly by a specific vendor 104A, B depending on the types of products or services they sell and their customer's needs In an alternative embodiment, the interactive messages consist of a linear or hierarchical set of interrogatives such as those shown in Table 1.0 above. The interrogatives consist of product or service determination questions which attempt to determine that a particular product or service is or would be used and groups of quantifier questions which attempt to elicit information about how those products are or would be used. The product or service determination questions are typically yes/no questions and each questions is associated with a particular product or service. Each product or service determination question is associated with one or more quantifier questions. Each quantifier question may be associated with more than one product or service determination questions. The quantifier questions are typically numeric response questions generally directed to determining the consumer's 102 demographics and/or preferences and the responses to these questions are used as multipliers in a computation to determine the suggested quantities of the associated products or services. Some quantifier questions seek yes/no responses. In this case, each response, yes or no, is associated with a multiplier value which is used in the overall computation.

The interrogatives, associated products or services, potential acceptable responses, multipliers and overall quantity computations are marketing driven and may be dynamically adjusted to reflect changes in available products or services or changes in how consumers 102 actually use those products or services. On the back-end, the assessment interface 222 works similar to the packages/templates interface 220. Associated with each product or service determination question is a grouping of one or more products or services. For example, a "yes" response to "do you use powdered laundry detergent?" is associated with a powdered laundry detergent product and may also be associated with a powdered fabric softener. The "no" response would be associated with a liquid laundry detergent product. Each response may have an unlim-

TABLE 2.0

| NO. OF UNITS PER YEAR | JAN | FEB | MAR | APR | MAY | JUN | JUL | AUG | SEP | OCT | NOV | DEC |
|---|---|---|---|---|---|---|---|---|---|---|---|---|
| 1 | 1 | 0 | 0 | 0 | 0 | 0 | 0 | 0 | 0 | 0 | 0 | 0 |
| 2 | 1 | 0 | 0 | 0 | 0 | 1 | 0 | 0 | 0 | 0 | 0 | 0 |
| 3 | 1 | 0 | 0 | 0 | 1 | 0 | 0 | 0 | 1 | 0 | 0 | 0 |
| 4 | 1 | 0 | 0 | 1 | 0 | 0 | 1 | 0 | 0 | 1 | 0 | 0 |
| 5 | 1 | 0 | 1 | 0 | 1 | 0 | 1 | 0 | 0 | 1 | 0 | 0 |
| 6 | 1 | 0 | 1 | 0 | 1 | 0 | 1 | 0 | 1 | 0 | 1 | 0 |
| 7 | 1 | 1 | 0 | 1 | 0 | 1 | 1 | 0 | 1 | 1 | 0 | 0 |
| 8 | 1 | 1 | 0 | 1 | 1 | 0 | 1 | 1 | 0 | 1 | 1 | 0 |
| 9 | 1 | 1 | 1 | 0 | 1 | 1 | 1 | 1 | 0 | 1 | 1 | 0 |
| 10 | 1 | 1 | 1 | 1 | 1 | 0 | 1 | 1 | 1 | 1 | 1 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |
| 13 | 2 | 1 | 1 | 1 | 1 | 1 | 1 | 1 | 1 | 2 | 1 | 0 |
| 14 | 2 | 1 | 1 | 1 | 1 | 1 | 1 | 1 | 1 | 2 | 1 | 1 |
| 15 | 2 | 1 | 1 | 1 | 2 | 1 | 1 | 1 | 2 | 1 | 1 | 1 |
| 16 | 2 | 1 | 1 | 1 | 2 | 1 | 1 | 1 | 2 | 1 | 2 | 1 |
| 17 | 2 | 2 | 2 | 0 | 2 | 2 | 0 | 2 | 2 | 2 | 0 | 1 |
| 18 | 2 | 2 | 2 | 0 | 2 | 2 | 0 | 2 | 2 | 2 | 1 | 1 |
| 19 | 2 | 2 | 1 | 2 | 2 | 1 | 2 | 2 | 2 | 1 | 1 | 1 |
| 20 | 2 | 2 | 1 | 2 | 2 | 1 | 2 | 2 | 2 | 2 | 1 | 1 |
| 24 | 2 | 2 | 2 | 2 | 2 | 2 | 2 | 2 | 2 | 2 | 2 | 2 |

For unit quantities between 20 and 24 or in excess of 24 units, the number of units is broken down into 24 unit quantities or fractions thereof and applied to the above table. Alternatively, logic may be applied which appropriately adjusts the size of each unit, depending upon the availability of different sizes of the given product or service, as discussed above.

ited number of associated products or services. The responses to the quantifier questions associated with that product or service determination question are then used to determine the quantity and recurrence pattern. For example, the response to the quantifier question "how many times do you do laundry in a month?" is "2" and the response to the quantifier question "how many loads do you do each time you do laundry? is "3."

If one box of powdered laundry detergent can do thirty-six loads of laundry, then one box will last this particular consumer six months using the computation of: use_rate/(uses_per_wash*washes_per_month). The interface 222 then suggests ordering one box of powdered laundry detergent every six months. While it will be appreciated that there are numerous ways to compute a suggested ordering frequency, typically, a suggested recurrence can be determined from the following variables:

Quantity per unit of product, i.e. number of ounces in a box
Suggested quantity per use of the product
Actual or projected number of uses by the consumer per iteration
(This may be multiplied by the number of persons in the household)
Wherein (Q/S)/A=number of iterations per unit=frequency of purchase
(Appropriate adjustments can be made for fractional results and where multiple units may be required in each iteration to meet the actual or projected use.)

Figure 5:
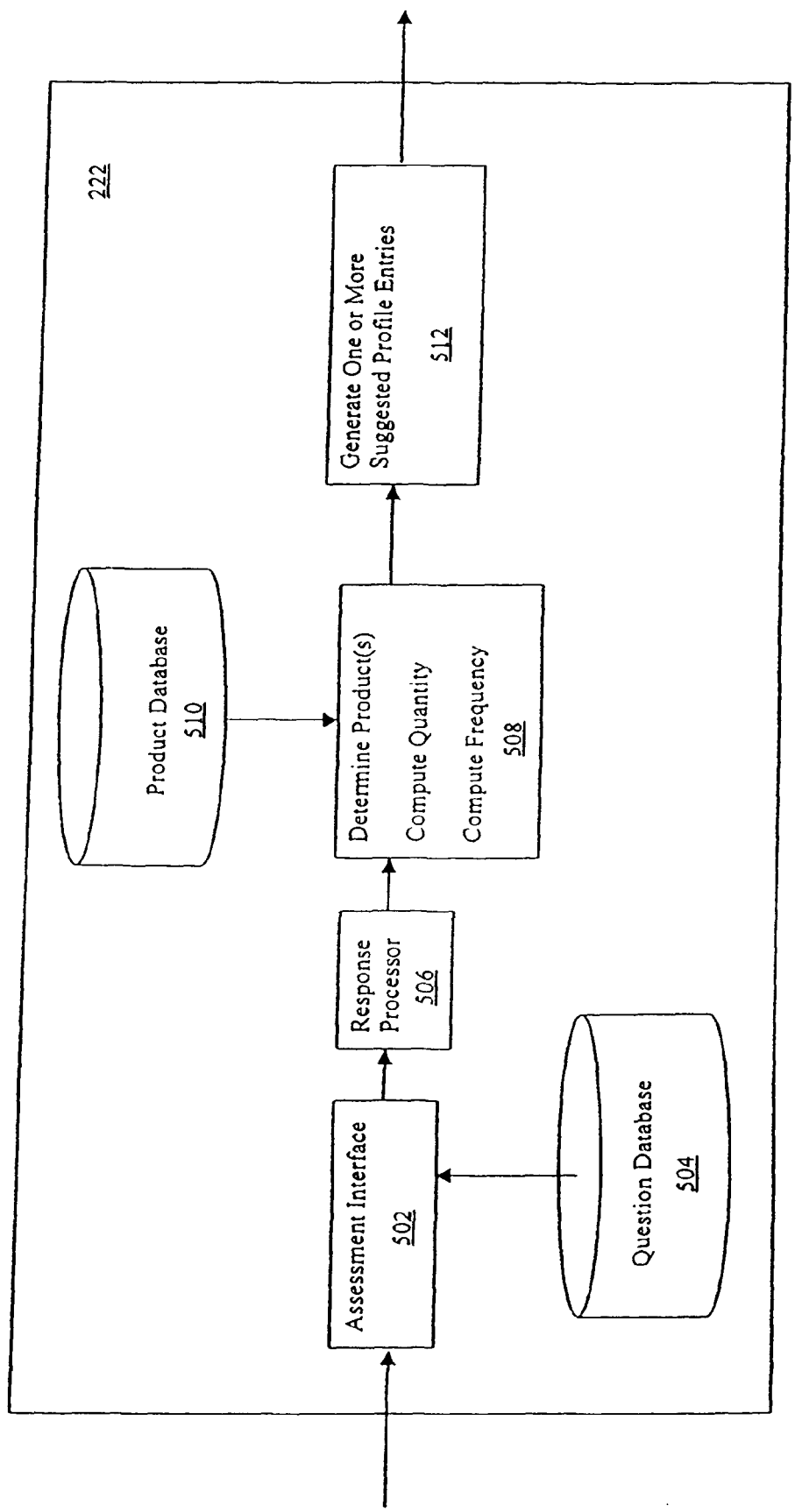
FIG. 5 depicts a block diagram of the assessment interface of FIG. 2.

FIG. 5 shows a block diagram of the assessment interface 222. The interface 222 includes an interface web page 502, a question database 504, a response processor 506, a quantity/frequency processor 508, a product database 510 and suggested profile generator 512. The interface web page 502 presents the interactive messages to the consumer 102. The available interactive messages are stored in the question database 504. Preferably, each consumer 102 is presented with a standard set of introductory interactive messages designed to initiate the process of determining the suggested products or services and accompanying quantities and recurrence pattern. As was described above, these introductory interactive messages are at the top level of a hierarchical or linear interrogatory structure or process flow and may lead to other interactive messages which attempt to elicit more specific and detailed responses from the consumer 102.

The consumer's 102 responses to the interactive messages are received by the response processor 506 which determines which products or services are to be suggested and gathers the factors which will be used in computing the suggested quantities and recurrence pattern for each. The product or service selection and the recurrence factors are sent to the quantity/frequency processor 508 which computes the suggested recurrence pattern and quantity per recurrence for the particular product or service. The quantity/frequency processor 508 is coupled with a product database 510 which supplies information about the recommended and/or reported uses of the products or services. The product database 510 further contains information about the availability of products or services in various unit quantities, the recommended quantity per use of the product or service and the predicted lifespan, use rate or shelf life of the product or service. The product database 510 may be provided by the vendor 104A, B or by the order management system 108. In one embodiment, the order management system 108 accesses the product database 510 via the network 106. Once the suggested product or service and associated recurrence has been determined, the information is passed to the suggested profile generator 512 which generates the suggested profile entries for the particular product or service. As the consumer 102 progresses through more interactive messages, the process is repeated for each suggested product or service. At any time, the consumer 102 may indicate that they are finished with the assessment of their needs. The suggested profile is then made available for balancing (described in more detail below) or sent to the profile confirmation/modification interface 226 (described in more detail below).

Referring to FIG. 2, the transaction history interface 224 provides an additional method for assisting the consumer 102 with specifying or updating a profile 210 with suggested products or services. The transaction history interface 224 is coupled with the order processing system of the vendor 104A, B so as to access the order history of the consumer 102. In one embodiment, the consumer 102 accesses the transaction history interface 224 and requests an analysis of their order history with one or more particular vendors 104A, B. Where the transaction history interface 224 determines a recurring pattern of purchases, the interface 224 suggests adding that particular product or service to a standing order profile 210 at the determined recurrence. In an alternative embodiment, the vendor 104A, B accesses the transaction history interface 224 to determine recurring patterns within that particular vendor's 104A, B consumer 102 base. The vendor 104A, B suggests to consumers 102 particular products or services for a standing order profile to increase their shopping convenience. This suggestion may be tied to a promotional offer. In yet another embodiment, the transaction history of other consumers 102, such as a consumer 102 of a same or similar demographic is used to generate a suggested profile for a particular consumer 102 or group of consumers 102.

The calculator function 214 provides a tool for a consumer 102 to determine a suggested recurrence or quantity for a particular product or service. The calculator function 214 is preferably made available from any of the interfaces 212, 232, 218, 220, 222, 224. In one embodiment, the calculator function 214 is an interactive pop up web page window. In another embodiment, the calculator function 214 is linked with the vendor's 104A, B product description web pages or shopping cart web pages and is made available via a selectable button or automatically displays when a product or service is selected. Selection of the link automatically identifies the product or service to the calculator function 214. The calculator function 214 receives information from the consumer 102 identifying a particular product or service, such as by SKU, name or description, provided manually or automatically as described above, and intended or actual usage information about that particular product or service. The calculator function 214 then computes a suggested recurrence and quantity per recurrence for that particular product or service. In one embodiment, the calculator function 214 generates a suggested profile entry for the particular product or service within the suggested profile 210. In an alternate embodiment, the calculator function displays the suggested results and allows the consumer 102 to enter the information into their profile 210.

Figure 4:
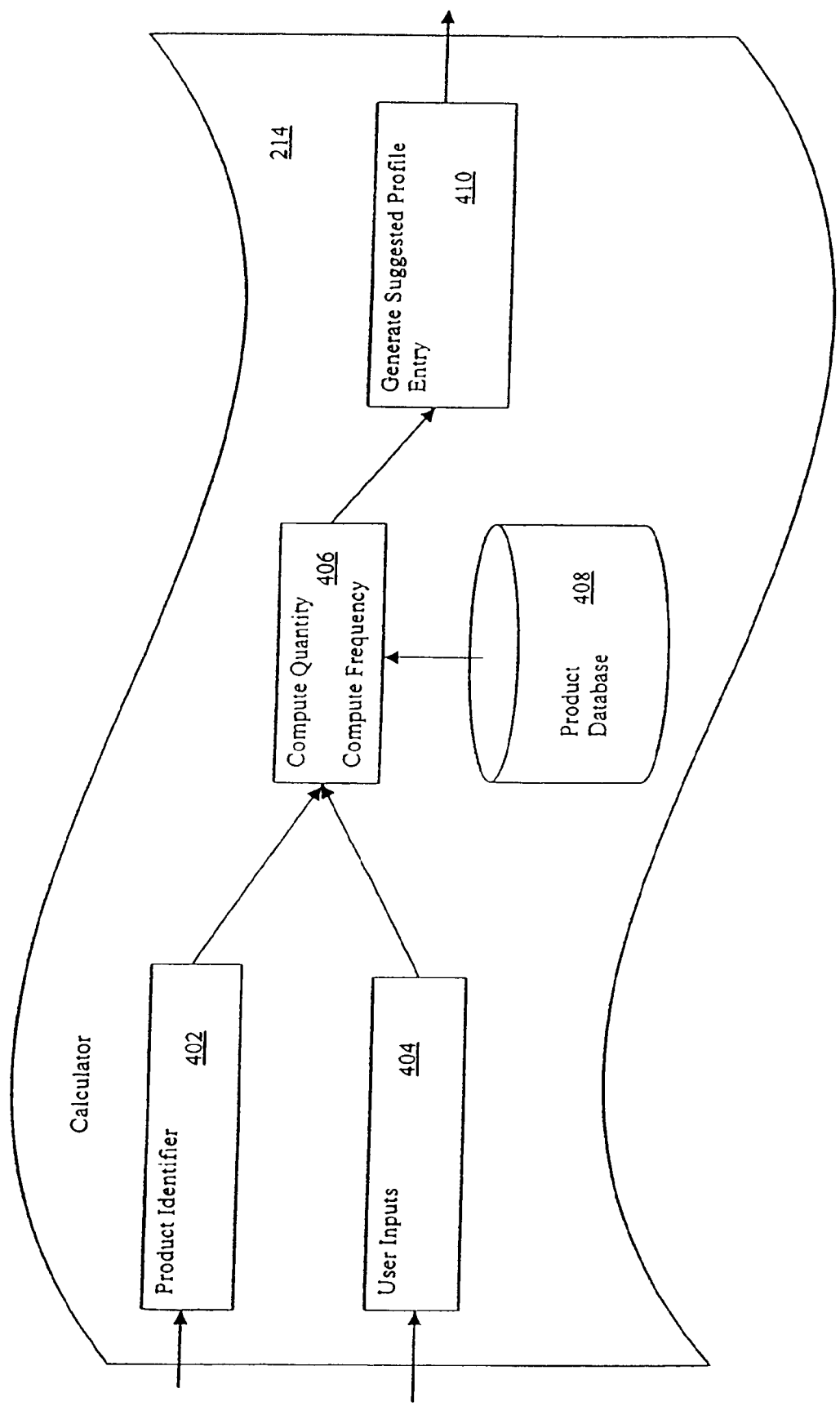
FIG. 4 depicts a block diagram of the calculator function of FIG. 2.

FIG. 4 shows a block diagram of the calculator function 214. The calculator function 214 includes a product identifier input 402, user data input 404, a quantity frequency processor 406, a product database 408 and a suggested profile entry generator 410. The inputs 402, 404 accept an identifier of the desired product or service and information about the consumer's 102 intended or actual usage of that particular product or service, as described above. These inputs 402, 404 are sent to the quantity/frequency processor 406 which computes the suggested recurrence and quantity per recurrence based on the user data inputs 404 and information about the product or service retrieved from the product database 408. The product database 408 supplies information about the recommended and/or reported uses of the products or services. The product database 408 further contains information about the availability of products or services in various unit quantities, the recommended quantity per use of the product or service and the predicted lifespan, shelf life or use rate of the product or service. The product database 408 may be provided by the vendor 104A, B or by the order management system 108. In one embodiment, the order management system 108 accesses the product database 408 via the network 106. Once the suggested recurrence has been computed, the information is passed to the suggested profile entry generator 410 which generates the suggested profile entries for the particular product or service. The consumer 102 may repeat the calculation function 214 for one or more products or services. At any time, the consumer 102 may indicate that they are finished with the calculation function 214. The suggested profile entries are then made available for balancing (described in more detail below) or sent to the profile confirmation/modification interface 226 (described in more detail below).

The packages/templates interface 220, the assessment interface 222, the transaction history interface 224 and the calculator function 214 are all designed to make creation and management of the recurring order profile 210 more convenient. Each of these interfaces 220, 222, 224, 214 are designed so that the consumer 102 does not have to figure out which products or services, what quantities of those products or services they need and/or when they should get them. These interfaces 220, 222, 224, 214 provide a method of analyzing the needs of the consumer 102 and offering them suggested products or services, suggested quantities and a suggested recurrence pattern in an automated and easy to use fashion. Vendors 104A, B benefit from increased customer retention and loyalty, and consumer's 102 benefit from convenience and control. Each interface 220, 222, 224, 214 effectively receives a request from a consumer 102 for suggestions of products or services to add to a standing order, suggested quantities of those products or services and a suggested recurrence pattern. The interfaces 220, 222, 224, 214 facilitate extracting the information from the consumer 102 necessary to make logical suggestions and generate an appropriate suggested profile 210.

Referring to FIG. 2, the profile generator 202 further provides a balancing function 216. The balancing function 216 equalizes the quantities and/or costs of each iteration of a recurring order as a function of the life of the order where the cost or quantity would otherwise vary as a function of the iteration. The balancing function 216 provides an interface for manipulating a suggested or existing profile 210 as described below. In one embodiment, the balancing function 216 comprises a pop up web page window accessible from any of the interfaces 212, 232, 218, 220, 222, 224 via a selectable button. In alternative embodiments, the balancing function 216 may comprise its own web page. Once a suggested profile 210 has been generated, there may be one or more anomalies in the recurrence pattern of that profile 210. Such anomalies include disproportionate quantities or costs for a particular recurrence iteration or set of iterations as compared to one or more of the remaining iterations or as compared to the life of the recurring order. In such cases, while the delivered quantities and recurrence pattern may represent an efficient distribution of ordered products or services with respect to usage, there may be a resultant disproportionate cost or quantity in one or more iterations. In other cases, the suggested quantities and recurrence pattern may not represent the most efficient distribution for that particular consumer 102. For example, in one month, the consumer 102 may receive a large quantity of a particular product or service and receive nothing over the next 5 months. Another example is where, in one month, the total order cost is $500 or more while the costs for the orders over the next 5 months are each less than $100. In these cases, the consumer 102 can choose to apply the balancing function 216 to the suggested profile 210.

The balancing function 216 spreads the distribution of the quantities and or costs more evenly across all of the or the remaining iterations of the order. In this way, disproportionate iterations are mitigated. In one embodiment, the consumer 102 may balance their profile 210 as a function of a total order cost, individual product or service cost, quantity per product or service, total order quantity or combinations thereof.

In an alternate embodiment wherein the order management system 108 or vendor 104A, B offers incentives or requires minimum purchases per iteration of the recurring order, the balancing function 216 can be used to spread the distribution of the iterations so as to maximize the earned incentives or ensure that monthly minimums are met without substantially increasing the ordered quantities. Further, wherein the vendor 104A, B comprises a multi-level marketing system which attaches incentive compensation value to each product or service, the balancing function 216 may be used to equalize the compensation earned on a monthly, weekly, or other interval, basis for the ordered products or services. Where the consumer 102 is a direct sales, retail or wholesale business, such balancing may be further used to ensure that sales goals are met for each iteration or to match the recurring order cycle to an inventory cycle. The consumer 102 may repeat the balancing function 216 for one or more different factors. At any time, the consumer 102 may indicate that they are finished with the balancing function 216. The suggested balanced profile entries are then sent to the profile confirmation/modification interface 226.

In an alternative embodiment, the order management system 108 provides a reminder interface 218 for adding recurring reminder messages to the consumers 102 profile 210. The reminder interface 108 allows the consumer 102 to enter any message and specify a recurrence pattern for that message, as described above. The message is preferably transmitted by electronic mail wherein the reminder interface 108 further permits the consumer 102 to enter their electronic mail address for the delivery information or user information of the profile. In alternative embodiments, the message can be delivered via telephone, facsimile or postal mail, and the reminder interface 218 further permits the consumer 102 to enter the appropriate delivery information into the profile 210. The consumer 102 may specify reminder messages to be delivered to other individuals or groups of individuals besides the consumer 102 themselves, such as family members or business associates. Exemplary reminder messages include birthday or anniversary reminders or any recurring event. Reminders may further be specified so as to couple with events which occur due to the order management system 108. For example, the consumer 102 can specify a reminder message to be transmitted one week prior to the processing of their recurring order so that they may have the opportunity to modify the order prior to processing. Alternatively, a reminder may be specified to alert the consumer 102 that their order has already been processed and that they should expect delivery soon.

Reminder messages may also be coupled with products or services specified in the profile 210. For example, a reminder may be specified for a spouse's birthday coupled with an order for a gift for that person.

In alternative embodiments, the order processing system 108 or the vendor 104A, B may include promotions or other product or service offers in the reminder message, also known as cross selling. Preferably, these promotions or other offers are included as HTTP links which allow the user to select the link and have their browser program automatically receive an order entry screen to take advantage of the offer. For example, a birthday reminder message may come with links which allow the recipient consumer 102 to purchase flowers or other gifts.

The reminder interface 218 may specify reminders for any recurring, or non-recurring event. In one embodiment, the reminder interface 218 presents a selection of pre-defined reminder messages for the consumer to select. In another embodiment, the reminder message comprises a bill payment from the consumer 102, as a debtor, to a particular creditor. The fulfillment entity 110A, B in this embodiment comprises a payment clearinghouse, bank or other bill payment facilitator. In this way, the reminder messages serve as a bill/debt payment system. The payment may also be coupled with a reminder message to the consumer 102 that the payment has been made pursuant to the profile 210. Further, in alternative embodiments, the vendor 104A, B or the order processing system 108 may add reminder messages to a consumer's profile 210 containing promotional offers or other information.

The reminder messages may be added based on an analysis of the consumer's profile 210 or purchasing history. In one embodiment, the order processing system 108 or vendor 104A, B checks the validity of the payment information provided in the profile 210 prior to the fulfillment of the order to determine if the information is still valid. If the payment information is invalid, a reminder message can be generated to the consumer 102 to rectify the situation prior to fulfillment of the order. In another embodiment, a reminder message can be specified when a consumer 102 cancels their standing order in order to offer them a promotion or other offer to reinstate their standing order. The consumer 102 may add as many reminder messages as desired. At any time, the consumer 102 may indicate that they are finished with the reminder interface 218. The reminder interface then generates profile entries for the profile confirmation/modification interface 226 (described in more detail below).

Once the consumer 102 has completed creating or updating a profile 210 using the interfaces 212, 232, 218, 220, 222, 224, confirmation of their actions is provided by the confirmation/modification interface 226. The confirmation/modification interface 226 is preferably a web page/screen or series of web pages/screens which present the consumer 102 with the current state of their suggested profile 210 or profile 210 alterations and gives them the options to create the new suggested profile 210 or update the existing profile 210 with the suggested or new entries. Further, the interface 226 provides the functionality to allow the consumer 102 to add additional products or services, remove unwanted products or services, adjust quantities or adjust the recurrence patterns. Further, the consumer 102 may modify their user, delivery or payment information. The interface 226 preferably is convenient for a consumer 102 to view, modify or cancel their recurring order. In one embodiment, the interface 226 provides an overview of the suggested profile including projected costs, projected cost savings and an iterative cost breakdown, total quantities and other summary information. The profile 210 may be presented to the consumer 102 in a product centric structure, listing each product, service or reminder in the profile 210 in a tabular format along with the associated recurrence and quantities. In another embodiment, the profile 210 is presented in a calendar centric structure, displaying a selectable visual representation of a daily, weekly, monthly, yearly or user specified calendar grid with the ordered products, services or reminders and associated quantities displayed according to their recurrence. In still another embodiment, both a tabular and calendar display are made available to the consumer 102 for their selection. It will be appreciated that such tabular or calendar based displays of the selected products, services or reminders and their associated quantities and recurrence patterns may also be made available via any of the interfaces 212, 232, 218, 220, 222, 224 and the calculator and balance functions 214, 216 for the purpose of displaying and/or reviewing the generated suggested products, services, reminders or associated quantities and recurrence patterns.

Further, the interface 226 provides HTTP links back to the interfaces 212, 232, 218, 220, 222, 224 and the calculator and balance functions 214, 216 so that the consumer 102 may modify one or more of their suggested profile entries. Once the consumer 102 accepts a given suggested profile 210, the entries are used to generate a new profile 210 or update an existing profile 210 in the profile database 206.

Figure 7:
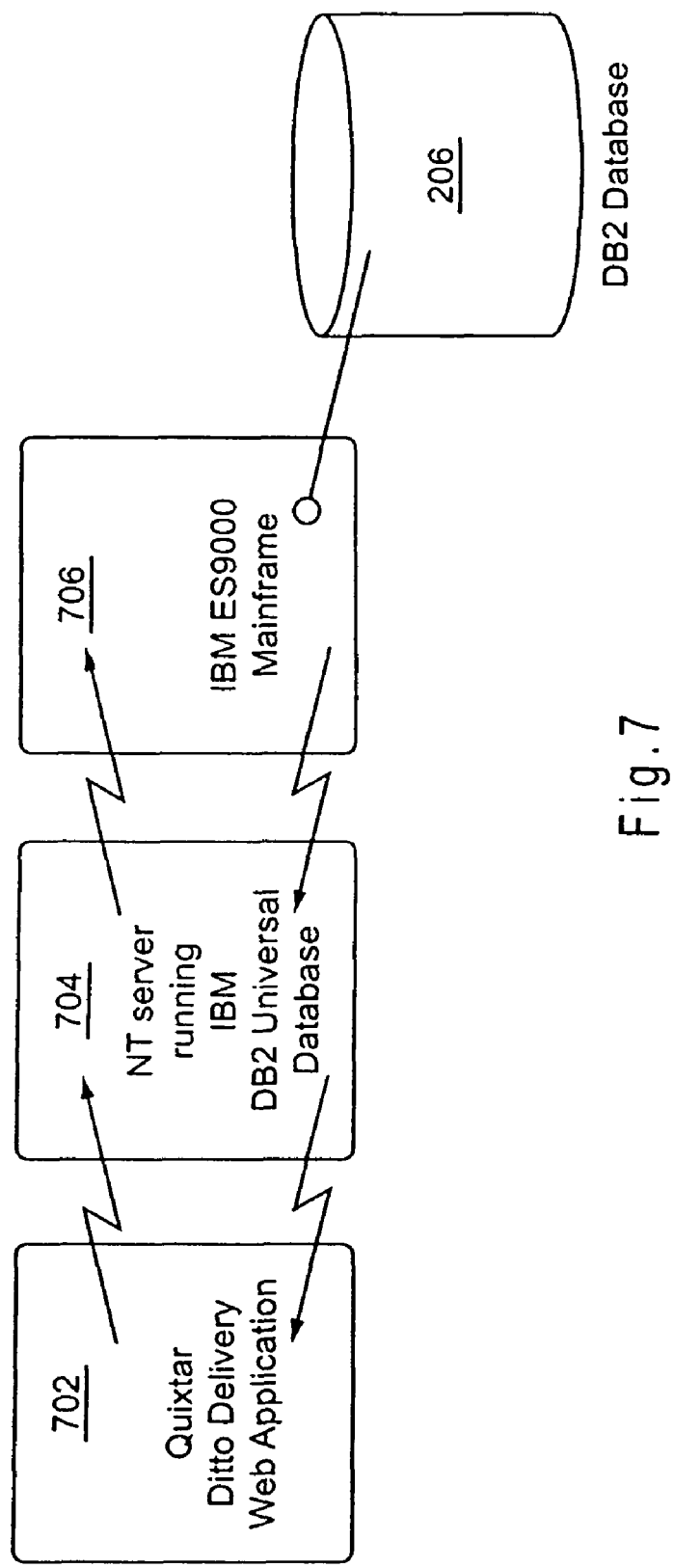
FIG. 7 depicts a schematic diagram of the structure of the recurring order management system of FIG. 2.

The profile database 206 stores the profiles 210 of the consumers 102 who utilize the order management system 108. Referring now to FIG. 7, there is shown a schematic diagram illustrating the integration of the web site interface 702 to the order management system 108 with the profile database 206. In the preferred embodiment, this database is implemented as a DB2 database. DB2 is a relational database management system manufactured by IBM Corporation, located in Armonk, N.Y. The web site interface application 702 is coupled with a server computer 704 preferably running the Windows NT™ operating system, manufactured by Microsoft Corporation, located in Redmond, Wash. The server computer 704 is further running a DB2 Universal Database open database connectivity ("ODBC") application program interface ("API"). The ODBC API couples the server computer 704 with the host mainframe 706 which hosts the order management system 108 databases including the profile database 206. In the preferred embodiment, the host mainframe is an IBM ES9000 manufactured by IBM Corporation, located in Armonk, N.Y. When a consumer 102 creates, modifies or otherwise accesses a profile, the web application 702 performs a function call via the server computer 704 and an ODBC connection to the host mainframe 706. The call initiates a DB2 stored procedure transaction which performs the desired function depending upon the data parameters that are passed during the call. All inquiries and updates are performed directly against the operational profile database 206 which is maintained on the host 706. It will be appreciated that other combinations of hardware and software may be used to achieve the desired functionality such as alternate database management systems such as Oracle8 manufactured by Oracle Corporation, located in Redwood Shores, Calif., which utilize a structured query language ("SQL") interface. In addition, other interface broker API's may also be used such as Java Database Connectivity or Common Object Request Architecture. The profile database 206 is structured as a set of four tables which maintain the information in the DB2 database described above. Referring to FIG. 8, there is shown a diagram of the preferred profile database 206 tables.

The order management system 108 further provides a profile management interface 204 which allows a consumer 102 to retrieve, view, edit or delete their profile 210. The profile management interface 204 is preferably implemented as web page/screen or series of web pages/screens which implement the profile management functionality. In one embodiment, the profile management interface 204 provides links to the profile generator 202. The profile management interface 204 provides access to all of the functionality described above for managing a recurring order profile 210.

The order/reminder generator 208 is coupled with the profile database 206 and further includes an interface 230 to the fulfillment entities 110A, B. The order/reminder generator 208 periodically scans the profiles 210 stored in the database 206 to determine if any orders are scheduled to recur during that period. In the preferred embodiment, the generator scans the profile database 206 daily. It will be appreciated that the scan period is a function of the minimum allowed order recurrence interval. When a scheduled recurring order is detected for the given period, the generator processes the order and submits the order to the fulfillment entities 110A, B to be fulfilled. In the case of reminder messages, this includes transmitting the message to an electronic mail server for transmission to the recipient. For multi-level marketing or commission based vendors 104A, B, the order generator 208 may also calculate the incentive compensation or sales bonus and assign the compensation or bonus to an appropriate business, sales person or independent business owner.

Figure 9:
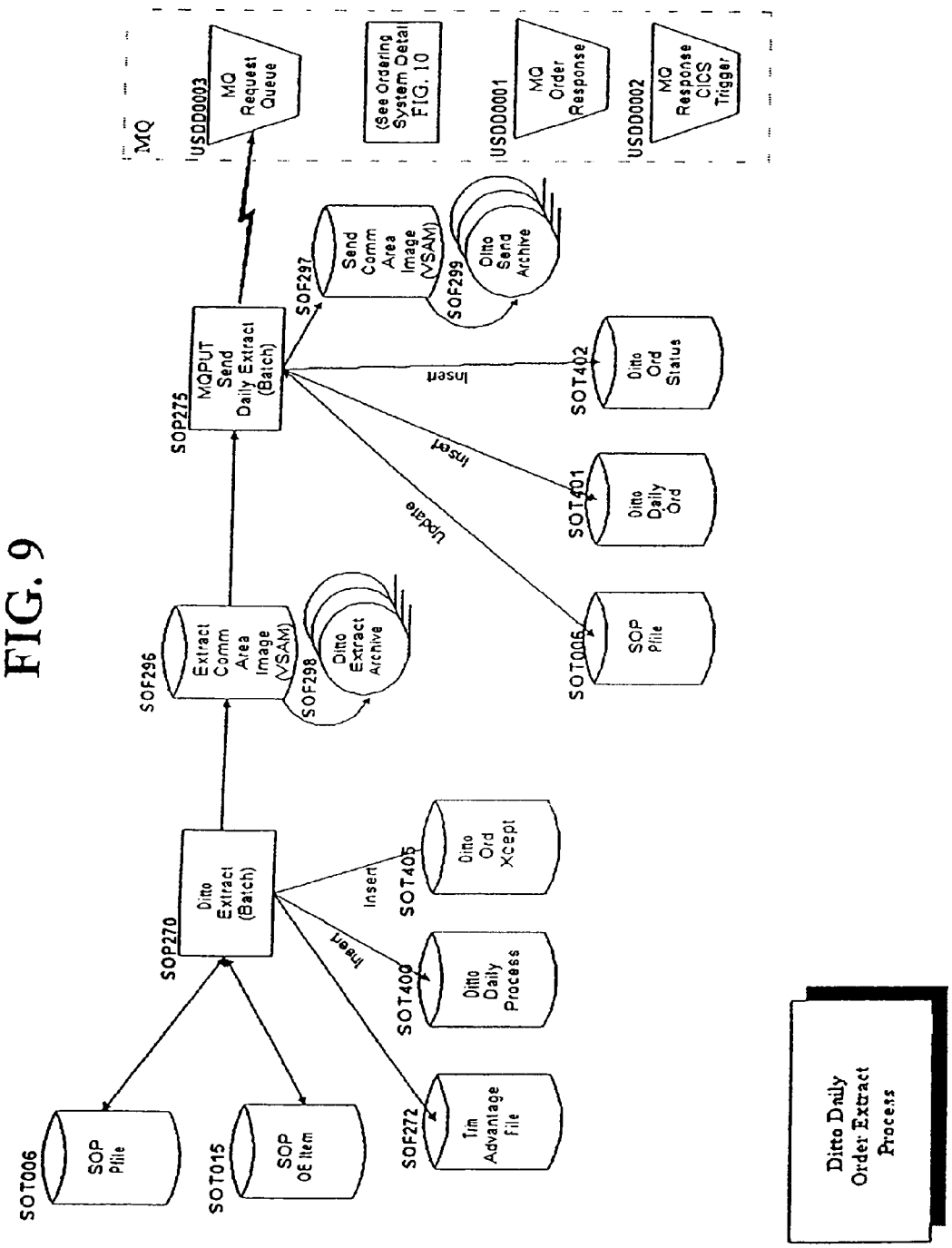
FIGS. 9-11 depict a schematic diagram of a preferred back end process for use with the recurring order management system of FIG. 2.
Figure 10:
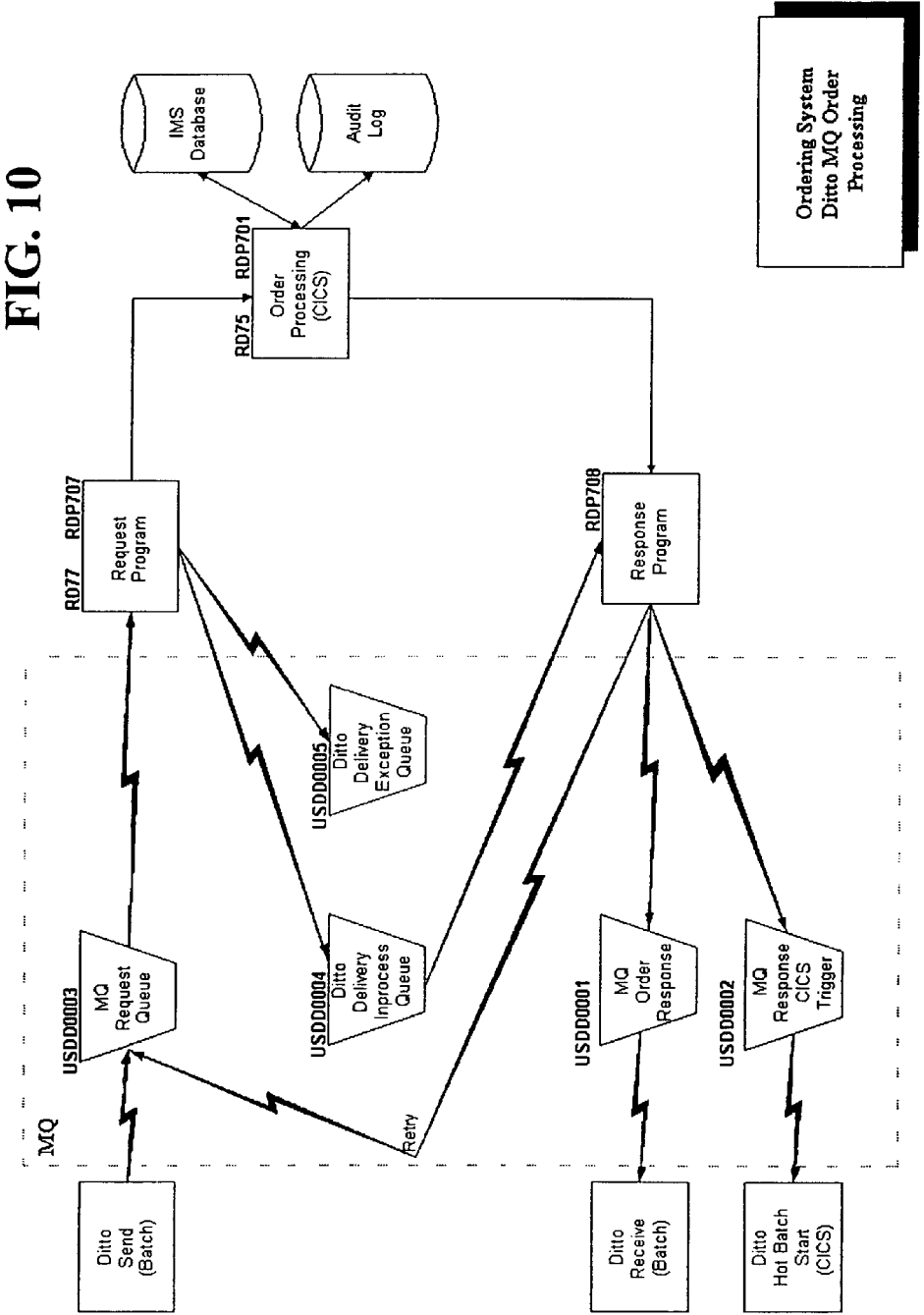
Figure 11:
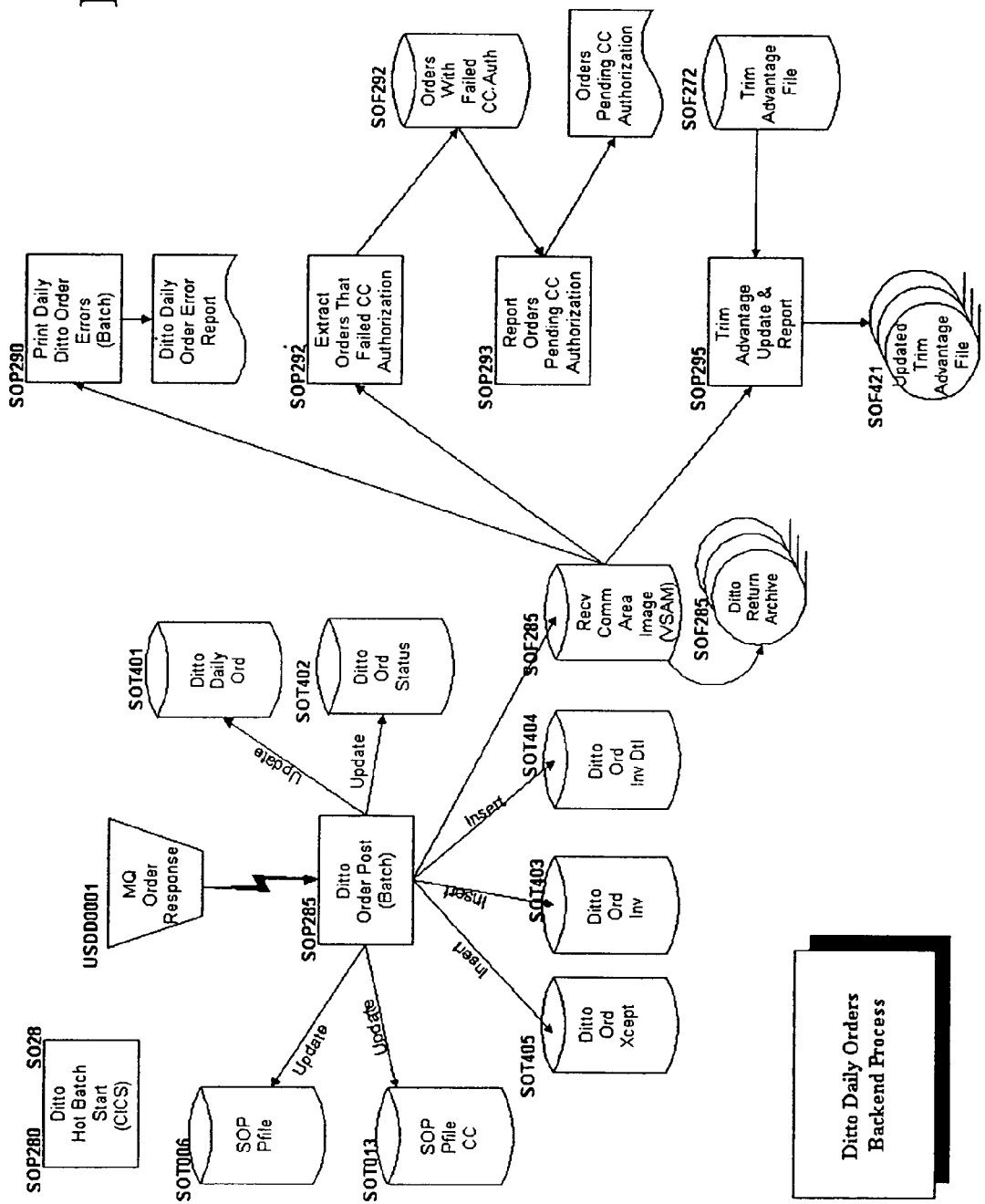
Figure 19B:
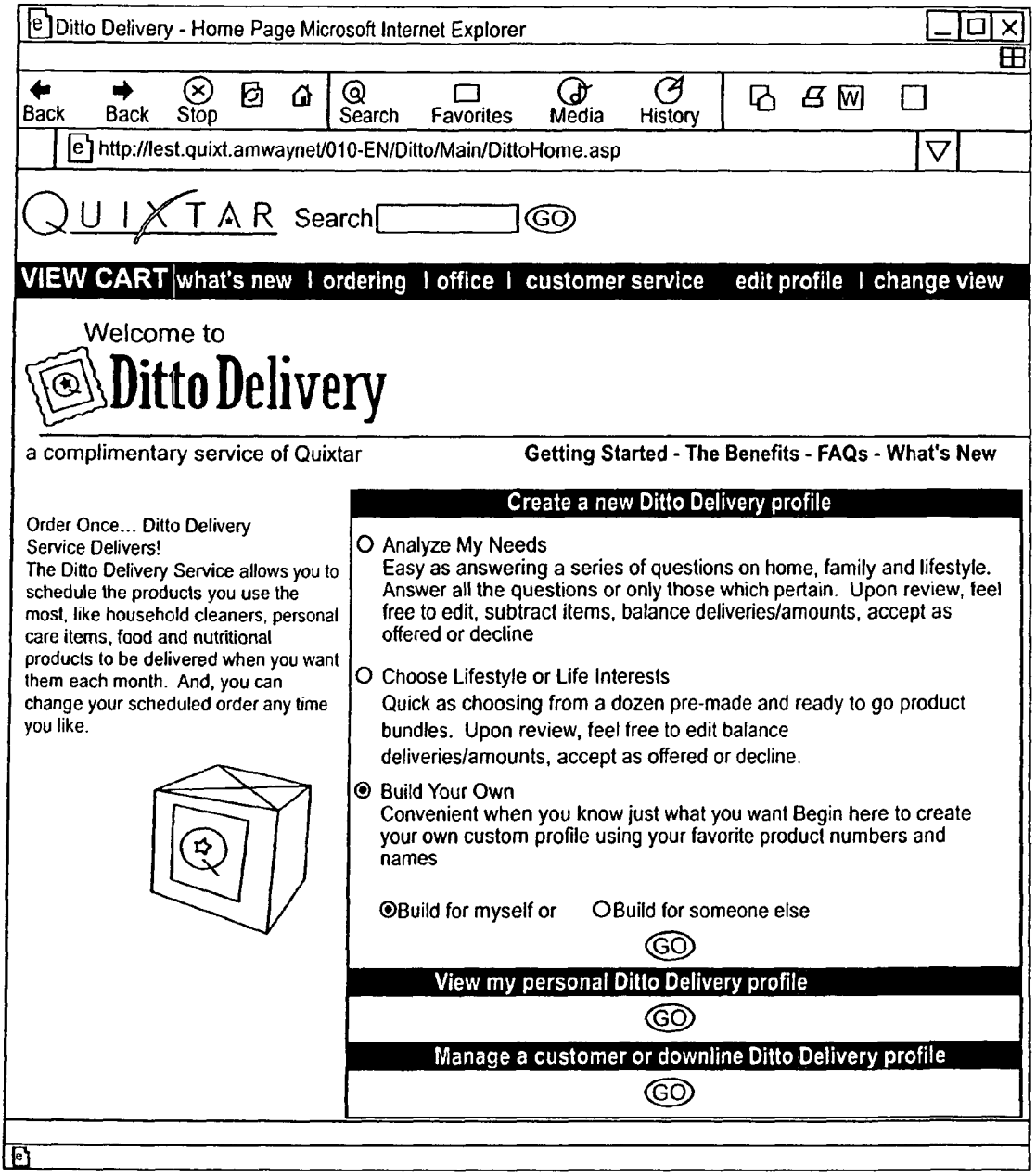
Figure 20B:
Figure 21B:
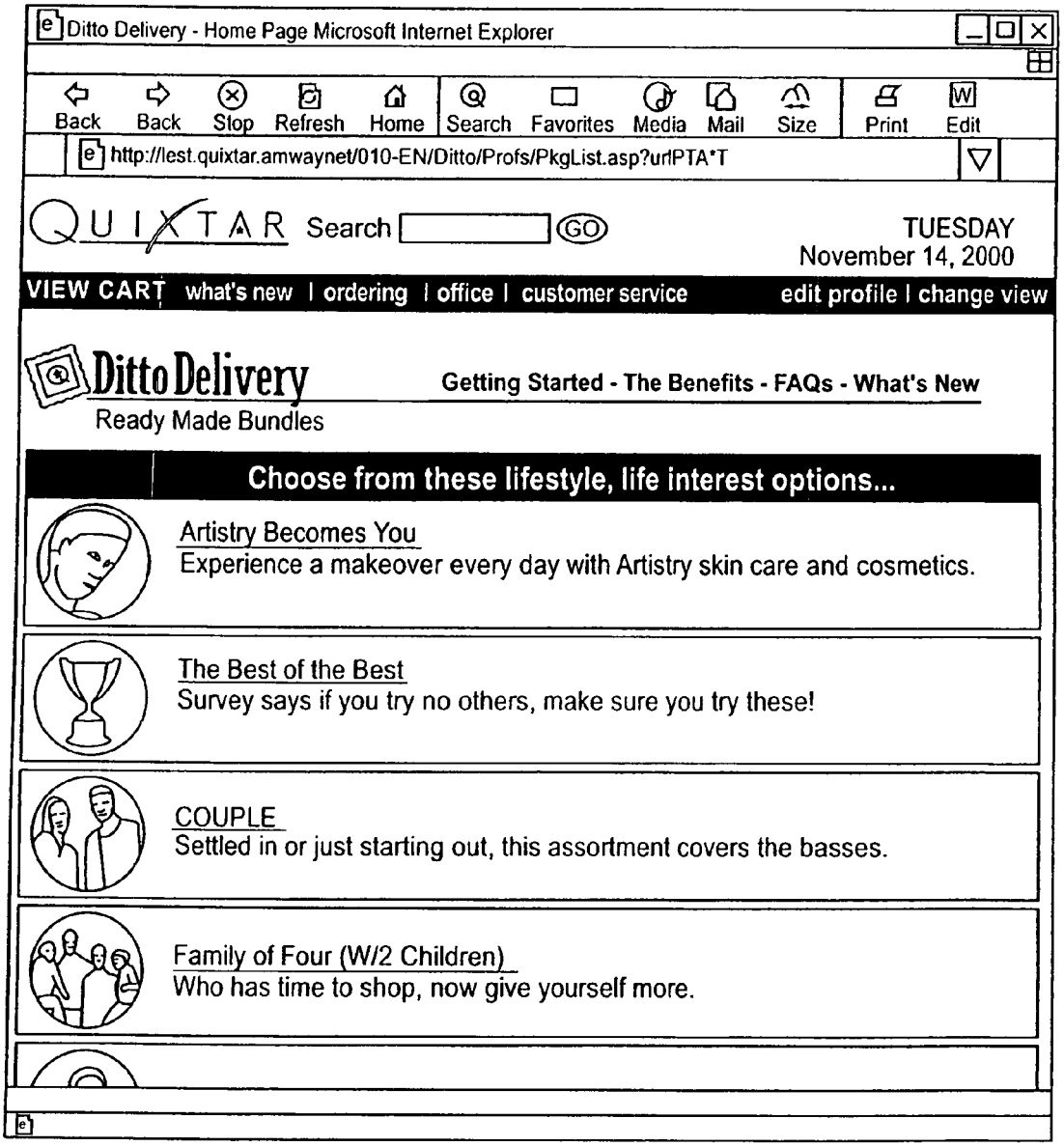

Referring to FIGS. 9-11, there is shown a block diagram of the preferred order generation process and fulfillment process. In the preferred embodiment, a batch process scans the profile database 206 nightly. The batch process selects all active profiles 210 which have a process day equal to the current day/date. The process then checks each product associated with the profile 210 to determine which products have been scheduled for the current month. Once this information has been determined, an order transaction is formatted which contains shipping information, such as name and address, billing information, such as credit card number, expiration date, and bonus information, such as order volume and IBO data, along with the product(s) scheduled for the month.

Once the order transaction is formatted, it is then sent via the IBM message queuing facility ("MQ") in a request queue. From the request queue, the order transaction is eventually picked up by a host ordering system which completes fulfillment. Upon completion of processing, the host ordering system places a transaction result in the MQ facility which is then picked up by the order management system 108 and the appropriate database files are updated. While the above system utilizes one process day per profile (limiting each profile to one shipment per month as was discussed above), it will be appreciated that a process day can be associated with each individual product, service or reminder allowing generation of multiple order transactions per month. In alternative embodiments, other processing time increments besides days are supported such as weekly or a particular day of the month, i.e. first Wednesday, second Tuesday, or a process which allows the profile 210 to trigger transaction processing may be implemented.

In an alternative embodiment, the order/reminder generator 208 validates the payment information provided in the profile 210 prior to transmitting the order to the fulfillment entities 110A, B. For example, the generator 208 communicates with a credit card processor to confirm that the credit card payment information provided in the profile 210 is still valid and that the credit limit has not been reached. In one embodiment, a determination of invalid payment information causes an automated message to be transmitted to the consumer 102 for remediation prior to fulfilling the order.

In another alternative embodiment, a statistical processor is coupled with the order/reminder generator for analysis of the recurring orders and profiles 210. Further, the statistical processor derives statistical information from the orders and profiles 210 for the purposes of marketing, such as for loyalty or frequency reward programs. Further the statistics can be used to optimize the order management system 108.

In another embodiment, the order management system 108 comprises a personal information manager which allows the consumer 102, in addition to storing recurring reminders and other calendar based events or product or service orders, to store contact/address book information (names, addresses), notes, journals or tasks. Further, the system 108 may also include an electronic mail box for the consumer to send and receive electronic mail. In alternative embodiments, the order management system 108 may integrate with personal information manager software such as Microsoft Outlook™, Lotus Notes™ or Novell GroupWise™ to allow profile 210 management.

In still another embodiment, the order management system 108 is accessible via wireless devices such as cellular telephones, personal digital assistants or wireless modem. This allows a consumer 102 to have constant access to their profile 210.

As described above, the disclosed embodiments provide a centralized fully automated and integrated recurring order management system 108 capable of managing recurring orders for products and services from multiple vendors 104A, B to be fulfilled by multiple fulfillment entities 110A, B. The order management system 108 provides a calendar centric automated any product/service/reminder, any time methodology. In this way, the order management system 108 becomes an intermediary entity which increases customer convenience, satisfaction and loyalty and provides value added services to vendors 104A, B. Consumers 102 also receive a value added service in that control over recurring orders is conveniently provided to the consumer. Further, the system 108 allows the consumer 102 to efficiently consolidate and manage all of their recurring purchases and reminders in one location. In this way, the order management system 108 becomes a convenient lifestyle management system capable of handling any recurring task, purchase or event.

In this way a method for facilitating electronic commerce through a network is described. The order management system 108 server receives requests for suggested orders for products or services, suggested quantities and a suggested recurrence from a consumer's 102 client browser system via a network, such as the Internet. The request is received into one of the interfaces 220, 222, 224 which generate a suggested profile for an order of products or services, including suggested quantities and a suggested order recurrence, that will automatically recur one or more times according to the suggested recurrence.

FIGS. 12-22 depict representative views of the various interface screens of the preferred embodiments. FIG. 12 depicts a first preferred interface screen for the recurring order management system 108. FIG. 13 depicts a second preferred interface screen for the recurring order management system 108. FIG. 14 depicts a first preferred descriptive screen for the recurring order management system 108. FIG. 15 depicts a second preferred descriptive screen for the recurring order management system 108. FIG. 16 depicts a first preferred confirmation/modification interface 226 screen for the recurring order management system 108. FIG. 17 depicts a first preferred suggested profile 210 data entry interface screen for the recurring order management system 108. FIG. 18 depicts a first preferred profile 210 confirmation screen for the recurring order management system 108. FIGS. 19A-B depict a third preferred interface screen for the recurring order management system 108. FIGS. 20A-B depict a first preferred assessment interface 222 screen for the recurring order management system 108. FIGS. 21A-B depict a first preferred packages/templates interface 220 screen for the recurring order management system 108. FIG. 22 depicts a second preferred confirmation/modification interface 226 screen for the recurring order management system 108

It is therefore intended that the foregoing detailed description be regarded as illustrative rather than limiting, and that it be understood that it is the following claims, including all equivalents, that are intended to define the spirit and scope of this invention.

The invention claimed is:

1. A method for facilitating electronic commerce through a network, said method comprising:
    (a) providing, via said network comprising at least one server computer capable of communicating with a browser system located at a remote client computer, one or more interactive messages relating to one or more of a plurality of products or services, said interactive messages comprising messages relating to usage information about how said first one or more suggested products or services are to be used;
    (b) receiving one or more responses to said one or more interactive messages;
    (c) determining a first suggested order based on said received one or more responses, said first suggested order comprising a first one or more suggested products or services of said plurality of products or services including determining a predicted lifespan corresponding to said first one or more suggested products or services;
    (d) calculating a first suggested recurrence for each of said first one or more suggested products or services and a first suggested quantity for each of said first one or more suggested products or services based on the received one or more responses and the predicted lifespan;
    (e) generating a first profile, said first profile comprising said first suggested order, wherein said first suggested order automatically recurs one or more times according to said first suggested recurrence; and
    (f) balancing said first suggested quantities and said first suggested recurrence to equalize a distribution of subsequent recurrences of said first suggested order.

2. The method of claim 1, further comprising:
    (f) confirming acceptance of said first suggested order prior to said generating.

3. The method of claim 1, wherein said plurality of products or services are associated with a multi-level marketing system.

4. The method of claim 3, wherein a user is registered with said multi-level marketing system as a client, member or independent business owner ("IBO") and wherein said receiving further comprises receiving said one or more responses from said user.

5. The method of claim 1, wherein said plurality of products or services is associated with a respective plurality of electronic commerce system products or services web files.

6. The method of claim 5, wherein said plurality of electronic commerce system products or services web files are operatively coupled with a web site associated with said network, said network comprising an electronic commerce system.

7. The method of claim 1, wherein said first profile is pre-existing, said generating further comprising updating said pre-existing first profile with said first suggested order.

8. The method of claim 1, further comprising:
    (f) fulfilling said first suggested order to a user according to said first profile.

9. The method of claim 8, wherein said receiving and generating are performed by a first one or more entities and said fulfilling is performed by a second entity different from said first one or more entities.

10. The method of claim 1, further comprising:
    (f) receiving a second request for a second suggested order, said second suggested order comprising a second one or more suggested products or services of said plurality of products or services, a second suggested recurrence for each of said second one or more suggested products or services and second suggested quantities; and
    wherein (e) further comprises generating a second profile, said second profile comprising said second suggested order, wherein said second suggested order automatically recurs one or more times according to said second suggested recurrence.

11. The method of claim 10, wherein said second suggested recurrence is different from said first suggested recurrence.

12. The method of claim 10, wherein said first profile and said second profile are the same profile.

13. The method of claim 1, further comprising:
    (f) altering said first profile according to one or more modifications.

14. The method of claim 13, wherein said modifications are received after said generating.

15. The method of claim 13, wherein said one or more modifications include adding one or more of said plurality of first electronic commerce system products or services to said first suggested order.

16. The method of claim 13, wherein said one or more modifications include removing one or more of said first one or more suggested products or services from said first suggested order.

17. The method of claim 13, wherein said one or more modifications include modifying said first suggested recurrence.

18. The method of claim 1, wherein said balancing substantially equalizes a distribution of cost per recurrence of said first suggested order.

19. The method of claim 1, wherein said balancing substantially equalizes a distribution of incentive compensation per recurrence of said first suggested order.

20. The method of claim 1, wherein said usage information comprises frequency of use of said first one or more suggested products or services.

21. The method of claim 1, wherein said usage information comprises quantity per use of said first one or more suggested products or services.

22. The method of claim 1, wherein a subset of said one or more interactive messages further relates to demographic information.

23. The method of claim 1, wherein a subset of said one or more interactive messages further relates to subjective preference information.

24. The method of claim 1, wherein a subset of said one or more interactive messages further relates to a specific product or service selected from said plurality of first electronic commerce system products or services.

25. The method of claim 1, wherein a subset of said one or more interactive messages further relates to use of a product or service.

26. The method of claim 1, wherein (e) further comprises accessing a product or service database to select said first one or more suggested products or services which correlate to said one or more responses.

27. The method of claim 1, further comprising:
    (f) providing one or more pre-defined groupings of one or more products or services selected from a plurality of products or services offered by one or more vendors; and
    wherein said one or more responses further comprises a selection indication of one or more of said one or more pre-defined groupings.

28. The method of claim 1, wherein said first suggested recurrence further comprises a first recurrence interval upon elapse of which said first suggested order is to recur.

29. The method of claim 27, wherein said first recurrence interval comprises one or more calendar months, said first suggested order further specifying which day of the month to fulfill said first suggested order.

30. The method of claim 1, wherein said first one or more suggested products or services comprise facilitating a payment between a debtor and a creditor.

31. The method of claim 30, wherein said one or more reminder messages comprise a message that an event is about to occur.

32. The method of claim 30, wherein said one or more reminder messages comprise electronic mail messages.

33. The method of claim 30, wherein said one or more reminder messages comprise telephone messages.

34. The method of claim 30, wherein said one or more reminder messages comprise postal mail messages.

35. The method of claim 30, wherein said first recurrence interval comprises one or more calendar months, said first suggested order further specifying which day of the month to fulfill said first suggested order.

36. The method of claim 1, wherein said first one or more suggested products or services comprise providing one or more reminder messages to a user.

37. The method of claim 36, wherein said event comprises impending recurrence of said first suggested order.

38. The method of claim 36, wherein said message further facilitates purchase of a product or service related to said event.

39. The method of claim 1, wherein said first profile is generated based on historical orders for one or more of said plurality of products or services.

40. The method of claim 1, wherein said first suggested recurrence further comprises a first recurrence interval upon elapse of which said first suggested order is to recur.

41. A method for facilitating electronic commerce through a network, said method comprising:
  (a) providing, via said network comprising at least one server computer capable of communicating with a browser system located at a remote client computer, one or more interactive messages relating to one or more of a plurality of products or services, said interactive messages comprising messages relating to usage information about how said first one or more suggested products or services are to be used;
  (b) receiving from a user registered with a multi-level marketing system as a client, member or independent business owner ("IBO"), by said at least one server computer, one or more responses to said one or more interactive messages;
  (c) determining a first suggested order based on said received one or more responses, said first suggested order comprising a first one or more suggested products or services of said plurality of products or services including determining a predicted lifespan corresponding to said first one or more suggested products or services;
  (d) calculating a first suggested recurrence for each of said first one or more suggested products or services and a first suggested quantity for each of said first one or more suggested products or services based on the received one or more responses and the predicted lifespan;
  (e) generating a first profile, said first profile comprising said first suggested order, wherein said first suggested order automatically recurs one or more times according to said first suggested recurrence; and
  (f) balancing said first suggested quantities and said first suggested recurrence to equalize a distribution of subsequent recurrences of said first suggested order.

* * * * *